United States Patent
Xiao et al.

(10) Patent No.: US 12,126,893 B2
(45) Date of Patent: Oct. 22, 2024

(54) IMAGE DISPLAY METHOD AND ELECTRONIC DEVICE

(71) Applicant: HONOR DEVICE CO., LTD., Guangdong (CN)

(72) Inventors: Bin Xiao, Shenzhen (CN); Dajun Ding, Shenzhen (CN); Yang Lu, Shenzhen (CN); Yu Wang, Shenzhen (CN); Congchao Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/919,579

(22) PCT Filed: Mar. 3, 2022

(86) PCT No.: PCT/CN2022/079142
§ 371 (c)(1),
(2) Date: Oct. 18, 2022

(87) PCT Pub. No.: WO2022/237287
PCT Pub. Date: Nov. 17, 2022

(65) Prior Publication Data
US 2024/0214669 A1 Jun. 27, 2024

(30) Foreign Application Priority Data
May 10, 2021 (CN) .......................... 202110506826.5

(51) Int. Cl.
*H04N 23/63* (2023.01)
*H04N 5/265* (2006.01)
*H04N 23/69* (2023.01)

(52) U.S. Cl.
CPC ........... *H04N 23/632* (2023.01); *H04N 5/265* (2013.01); *H04N 23/635* (2023.01); *H04N 23/69* (2023.01)

(58) Field of Classification Search
CPC .... H04N 23/632; H04N 5/265; H04N 23/635; H04N 23/69; H04N 23/13; H04N 23/45;
(Continued)

(56) References Cited

U.S. PATENT DOCUMENTS

| | | | |
|---|---|---|---|
| 10,909,703 B2 | 2/2021 | Shen | |
| 2010/0238327 A1* | 9/2010 | Griffith | .................. H04N 23/69 348/240.99 |

(Continued)

FOREIGN PATENT DOCUMENTS

| | | |
|---|---|---|
| CN | 106791400 A | 5/2017 |
| CN | 108965742 A | 12/2018 |

(Continued)

*Primary Examiner* — Albert H Cutler

(57) ABSTRACT

This application relates to the technical field of electronic devices, and provides an image display method and an electronic device. The solution includes: receiving, a first operation performed by a user on a first interface, where the first interface is a viewfinder interface for image capture by the electronic device, and the first interface includes a preview image; saving, in response to the first operation; displaying, the first image; receiving, a third operation, where the third operation is used for triggering the electronic device to display a first region image in a magnified first image, and the first region image includes a first target region image; and splicing, the second image to the first target region image for displaying in response to the third operation.

16 Claims, 17 Drawing Sheets

(58) Field of Classification Search
CPC .... H04N 23/951; H04N 23/58; H04N 23/581; H04N 23/63
See application file for complete search history.

(56) References Cited

U.S. PATENT DOCUMENTS

| | | | |
|---|---|---|---|
| 2011/0050963 | A1 | 3/2011 | Watabe et al. |
| 2015/0207999 | A1 | 7/2015 | Han |
| 2016/0028949 | A1* | 1/2016 | Lee ................ H04N 23/45 348/218.1 |
| 2017/0034449 | A1* | 2/2017 | Eum ............... H04N 23/635 |
| 2018/0007281 | A1 | 1/2018 | Han |
| 2019/0253633 | A1* | 8/2019 | Kim ................ H04N 23/62 |
| 2021/0075975 | A1* | 3/2021 | Du ................. H04N 23/698 |
| 2021/0136296 | A1 | 5/2021 | Kim et al. |
| 2021/0385368 | A1 | 12/2021 | Zhang et al. |

FOREIGN PATENT DOCUMENTS

| | | |
|---|---|---|
| CN | 110941375 A | 3/2020 |
| CN | 111010506 A | 4/2020 |
| CN | 111050143 A | 4/2020 |
| CN | 111294517 A | 6/2020 |
| CN | 111541845 A | 8/2020 |
| CN | 112598571 A | 4/2021 |
| CN | 112637481 A | 4/2021 |
| CN | 113364976 A | 9/2021 |

* cited by examiner

IMAGE DISPLAY METHOD AND ELECTRONIC DEVICE

This application is a National Stage of International Application No. PCT/CN2022/079142, filed on Mar. 3, 2022, which claims priority to Chinese Patent Application No. 202110506826.5, filed on May 10, 2021. The disclosures of both the aforementioned applications are incorporated herein by reference in its entirety their entireties.

TECHNICAL FIELD

Embodiments of this application relate to the technical field of electronic devices, and in particular, to an image display method and an electronic device.

BACKGROUND

As the technology of electronics develops, electronic devices (such as mobile phones, tablet computes, or smart watches) have increasing functions. For example, a camera may be mounted in most electronic devices, so that the electronic devices can capture images.

For example, in a mobile phone, a plurality of cameras such as a main camera, a telephoto camera, and a wide-angle camera may be mounted. Based on characteristics of the above cameras, the mobile phone can capture images in a same image capture scenario by using different cameras, so as to obtain images with different characteristics. For example, based on a long focal length of the telephoto camera, the mobile phone can capture a locally clear telephoto image by using the telephoto camera. For another example, based on a large amount of incident light and a high resolution of the main camera, the mobile phone can capture an overall clear image by using the main camera. For another example, based on a short focal length and a large field of view of the wide-angle camera, a mobile phone can capture images with a relatively large field of view by using the wide-angle camera. Therefore, a user can view images with different characteristics on a mobile phone.

However, in the above technical solution, the electronic device is required to perform switching between displayed images so that the user can view images with different characteristics on the mobile phone. The process of displaying images with different characteristics by an electronic device is cumbersome, affecting user experience.

SUMMARY

This application provides an image display method and an electronic device, to simplify a process of displaying images with different characteristics by the electronic device, thereby improving user experience.

According to a first aspect, this application provides an image display method. The method is applicable to an electronic device. The electronic device includes a display, a first camera, and a second camera. A field of view of the first camera is larger than a field of view of the second camera.

The method includes: receiving, by the electronic device, a first operation performed by a user on a first interface, where the first interface is a viewfinder interface for image capture by the electronic device, and the first interface includes a preview image acquired by the first camera; saving, by the electronic device in response to the first operation, a first image acquired by the first camera and a second image acquired by the second camera, where a viewfinder coverage in which the first camera acquires the first image is a first viewfinder coverage, a viewfinder coverage in which the second camera acquires the second image is a second viewfinder coverage, and the first viewfinder coverage is larger than the second viewfinder coverage; receiving, by the electronic device, a second operation, where the second operation is used for triggering the electronic device to display the first image; displaying, by the electronic device, the first image in response to a second operation; receiving, by the electronic device, a third operation, where the third operation is used for triggering the electronic device to display a first region image in a magnified first image, the first region image includes a first target region image, a viewfinder coverage of the first target region image relative to the first camera is a third viewfinder coverage, the first viewfinder coverage includes the third viewfinder coverage, and the third viewfinder coverage coincides with the second viewfinder coverage; and splicing, by the electronic device, the second image to the first target region image for displaying in response to the third operation.

Based on the above technical solutions, after receiving the third operation, the electronic device may display a region in the first region image except for the first target region image and the second image. In this way, the electronic device can display characteristics of both the first image and the second image in one image, thereby ensuring that a user can view the first image and the second image simultaneously. Moreover, compared with a conventional technical solution, the technical solution of this application can simplify the process of displaying images with different characteristics by the electronic device, thereby improving user experience.

With reference to the first aspect, in a possible design, after the receiving, by the electronic device, a second operation, the method further includes: splicing, by the electronic device, the second image to a second target region image in the first image for displaying in response to the second operation, where a viewfinder coverage of the second target region image relative to the first camera coincides with the second viewfinder coverage.

That is to say, when displaying the first image, the electronic device may directly splice the second image to the second target region image in the first image for displaying, without a need to receive an operation of a user (for example, the third operation). In this way, the electronic device can simultaneously display a partial region in the first image and the second image. Compared with the conventional technical solution, the technical solution of this application can simplify the process of displaying images with different characteristics by the electronic device, thereby improving user experience.

With reference to the first aspect, in another possible design, after the receiving, by the electronic device, a third operation, the method further includes: obtaining, by the electronic device, a resolution of the first region image and a resolution of the display; and calculating, by the electronic device, a first ratio according to the resolution of the first region image and the resolution of the display, where the first ratio is a ratio of the resolution of the first region image to the resolution of the display; and splicing, by the electronic device, the second image to the first target region image for displaying in a case that the first ratio is greater than a first preset ratio.

It may be understood that, by comparing the first ratio with the first preset ratio, the electronic device may control a timing of splicing the second image to the first target region image for displaying. In this way, the electronic device can display the second image in a preset condition, thereby improving user experience.

With reference to the first aspect, in another possible design, after the receiving, by the electronic device, a third operation, the method further includes: obtaining, by the electronic device, a first factor, where the first factor is a magnification factor after the third operation triggers the electronic device to magnify the first image; and splicing, by the electronic device, the second image to the first target region image for displaying in a case that the first factor is greater than a first preset magnification factor.

It may be understood that, by comparing the first factor with the first preset magnification factor, the electronic device may control splicing of the second image to the first target region image for displaying. In this way, the electronic device can display the second image in a preset condition, thereby improving user experience.

With reference to the first aspect, in another possible design, the obtaining, by the electronic device, a first factor may include: obtaining, by the electronic device, the magnification factor of the first image, the resolution of the first image, and the resolution of the first region image; and calculating, by the electronic device, the first factor according to the magnification factor of the first image, the resolution of the first image, and the resolution of the first region image.

It may be understood that, after obtaining the magnification factor of the first image, the resolution of the first image, and the resolution of the first region image, the electronic device may calculate the first factor, and then control splicing of the second image to the first target region image for displaying. In this way, the electronic device can display the second image in a preset condition, thereby improving user experience.

With reference to the first aspect, in another possible design, the first factor satisfies the following formula:

$$M = \sqrt{\frac{B}{A}} \times Z$$

where M represents the first factor, B represents the resolution of the first image, A represents the resolution of the first region image, and Z represents the magnification factor of the first image.

With reference to the first aspect, in another possible design, the method further includes: blurring, by the electronic device, a region in the first region image except for the first target region image in response to the third operation.

It may be understood that, since the electronic device blurs the region in the first region image except for the first target region image, a degree of abnormality at a splicing of the second image and the first region image can be reduced. In this way, quality of the image displayed by the electronic device can be improved, thereby improving user experience.

With reference to the first aspect, in another possible design, the electronic device further includes a third camera, and the field of view of the second camera is larger than a field of view of the third camera. The method further includes: saving, by the electronic device in response to the image capture operation, a third image acquired by the third camera, where a viewfinder coverage in which the third camera acquires the third image is a fourth viewfinder coverage, and the second viewfinder coverage is larger than the fourth viewfinder coverage.

With reference to the first aspect, in another possible design, the method may further include: receiving, by the electronic device, a fourth operation, where the fourth operation is used for triggering the electronic device to display a second region image in a magnified second image, the second region image includes a third target region image, a viewfinder coverage of the third target region image relative to the second camera is a fifth viewfinder coverage, the second viewfinder coverage includes the fifth viewfinder coverage, and the fifth viewfinder coverage coincides with the fourth viewfinder coverage; obtaining, by the electronic device, a resolution of the second region image and the resolution of the display; calculating, by the electronic device, a second ratio according to the resolution of the second region image and the resolution of the display, where the second ratio is a ratio of the resolution of the second region image to the resolution of the display; and splicing, by the electronic device, the third image to the third target region image for displaying in a case that the second ratio is greater than the first preset ratio.

That is to say, after receiving the third operation, the electronic device may display a region in the second region image except for the third target region image and the third image. In this way, the electronic device can display characteristics of both the second image and the third image in one image, thereby ensuring that a user can view the second image and the third image simultaneously. Moreover, compared with the conventional technical solution, the technical solution of this application can simplify the process of displaying images with different characteristics by the electronic device, thereby improving user experience.

With reference to the first aspect, in another possible design, the method may further include: receiving, by the electronic device, a fourth operation, where the fourth operation is used for triggering the electronic device to display a second region image in a magnified second image, the second region image includes a third target region image, a viewfinder coverage of the third target region image relative to the second camera is a fifth viewfinder coverage, the second viewfinder coverage includes the fifth viewfinder coverage, and the fifth viewfinder coverage coincides with the fourth viewfinder coverage; obtaining, by the electronic device, a second factor, where the second factor is a magnification factor after the fourth operation triggers the electronic device to magnify the second image; and splicing, by the electronic device, the third image to the third target region image for displaying in a case that the second factor is greater than a second preset magnification factor.

That is to say, after receiving the third operation, the electronic device may display a region in the second region image except for the third target region image and the third image. In this way, the electronic device can display characteristics of both the second image and the third image in one image, thereby ensuring that a user can view the second image and the third image simultaneously. Moreover, compared with the conventional technical solution, the technical solution of this application can simplify the process of displaying images with different characteristics by the electronic device, thereby improving user experience.

According to a second aspect, this application provides an electronic device. The electronic device includes a memory, a display, and one or more processors, where the memory and the display are coupled to the processor. The memory is configured to store computer program code, and the computer program code includes computer instructions. When the computer instructions are executed by the one or more processors, the processors are configured to receive a first operation performed by a user on a first interface, where the first interface is a viewfinder interface for image capture by the electronic device, and the first interface includes a preview image acquired by the first camera. The memory is configured to save, in response to the first operation, a first image acquired by the first camera and a second image acquired by the second camera, where a viewfinder coverage in which the first camera acquires the first image is a first viewfinder coverage, a viewfinder coverage in which the second camera acquires the second image is a second viewfinder coverage, and the first viewfinder coverage is larger than the second viewfinder coverage. The display is configured to display the first image in response to a second operation. The processors are further configured to receive a third operation, where the third operation is used for triggering the electronic device to display a first region image in a magnified first image, the first region image includes a first target region image, a viewfinder coverage of the first target region image relative to the first camera is a third viewfinder coverage, the first viewfinder coverage includes the third viewfinder coverage, and the third viewfinder coverage coincides with the second viewfinder coverage. The processors are further configured to splice the second image to the first target region image for displaying in response to the third operation.

With reference to the second aspect, in a possible design, when the computer instructions are executed by the one or more processors, the processors are further configured to splice the second image to a second target region image in the first image for displaying in response to the second operation, where a viewfinder coverage of the second target region image relative to the first camera coincides with the second viewfinder coverage.

With reference to the second aspect, in another possible design, when the computer instructions are executed by the one or more processors, the processors are further configured to obtain a resolution of the first region image and a resolution of the display. The processors are further configured to calculate a first ratio according to the resolution of the first region image and the resolution of the display, where the first ratio is a ratio of the resolution of the first region image to the resolution of the display. The processors are further configured to splice the second image to the first target region image for displaying in a case that the first ratio is greater than a first preset ratio.

With reference to the second aspect, in another possible design, when the computer instructions are executed by the one or more processors, the processors are further configured to obtain a first factor, where the first factor is a magnification factor after the third operation triggers the electronic device to magnify the first image. The processors are further configured splice the second image to the first target region image for displaying in a case that the first factor is greater than a first preset magnification factor.

With reference to the second aspect, in another possible design, when the computer instructions are executed by the one or more processors, the processors are further configured to obtain the magnification factor of the first image, the resolution of the first image, and the resolution of the first region image. The processors are further configured calculate the first factor according to the magnification factor of the first image, the resolution of the first image, and the resolution of the first region image.

With reference to the second aspect, in another possible design, the first factor satisfies the following formula:

$$M = \sqrt{\frac{B}{A}} \times Z$$

where M represents the first factor, B represents the resolution of the first image, A represents the resolution of the first region image, and Z represents the magnification factor of the first image.

With reference to the second aspect, in another possible design, when the computer instructions are executed by the one or more processors, the processors are further configured to blur a region in the first region image except for the first target region image in response to the third operation.

With reference to the second aspect, in another possible design, the electronic device further includes a third camera, and the field of view of the second camera is larger than a field of view of the third camera. When the computer instructions are executed by the one or more processors, the processors are further configured to save, in response to the image capture operation, a third image acquired by the third camera, where a viewfinder coverage in which the third camera acquires the third image is a fourth viewfinder coverage, and the second viewfinder coverage is larger than the fourth viewfinder coverage.

With reference to the second aspect, in another possible design, when the computer instructions are executed by the one or more processors, the processors are further configured to receive a fourth operation, where the fourth operation is used for triggering the electronic device to display a second region image in a magnified second image, the second region image includes a third target region image, a viewfinder coverage of the third target region image relative to the second camera is a fifth viewfinder coverage, the second viewfinder coverage includes the fifth viewfinder coverage, and the fifth viewfinder coverage coincides with the fourth viewfinder coverage. The processors are further configured to obtain a resolution of the second region image and the resolution of the display. The processors are further configured to calculate a second ratio according to the resolution of the second region image and the resolution of the display, where the second ratio is a ratio of the resolution of the second region image to the resolution of the display. The processors are further configured to splice the third image to the third target region image for displaying in a case that the second ratio is greater than the first preset ratio.

With reference to the second aspect, in another possible design, when the computer instructions are executed by the one or more processors, the processors are further configured to receive a fourth operation, where the fourth operation is used for triggering the electronic device to display a second region image in a magnified second image, the second region image includes a third target region image, a viewfinder coverage of the third target region image relative to the second camera is a fifth viewfinder coverage, the second viewfinder coverage includes the fifth viewfinder coverage, and the fifth viewfinder coverage coincides with the fourth viewfinder coverage. The processors are further configured to obtain a second factor, where the second factor is a magnification factor after the fourth operation triggers the electronic device to magnify the second image. The processors are further configured splice the third image to the third target region image for displaying in a case that the second factor is greater than a second preset magnification factor.

According to a third aspect, this application provides an electronic device. The electronic device includes a memory, a display, and one or more processors, where the memory and the display are coupled to the processor. The memory is configured to store computer program code, and the computer program code includes computer instructions. The computer instructions, when executed by the one or more processors, cause the electronic device to perform the method described in the first aspect and any one of the possible designs thereof.

According to a fourth aspect, this application provides a chip system applicable to an electronic device. The chip system includes one or more interface circuits and one or more processors. The interface circuits and the processor are connected to each other by wires. The interface circuit are configured to receive signals from a memory of the electronic device and send the signals to the processors, where the signals include computer instructions stored in the memory. When the processors execute the computer instructions, the electronic device performs the method described in the first aspect and any one of the possible designs thereof.

According to a fifth aspect, this application provides a computer-readable storage medium. The computer-readable storage medium includes computer instructions which, when run on an electronic device, cause the electronic device to perform the method described in the first aspect and any one of the possible designs thereof.

According to a sixth aspect, this application provides a computer program product which, when run on a computer, causes the computer to perform the method described in the first aspect and any one of the possible designs thereof.

It may be understood that, for beneficial effects that can be achieved by the electronic device described in the second aspect and any one of the possible designs thereof, the electronic device described in the third aspect, the chip system described in the fourth aspect, and the computer-readable storage medium described in the fifth aspect, and the computer program product described in the sixth aspect provided above, refer to the beneficial effects in the first aspect and any one of the possible designs thereof, and details are not repeated herein.

DESCRIPTION OF EMBODIMENTS

Figure 1:
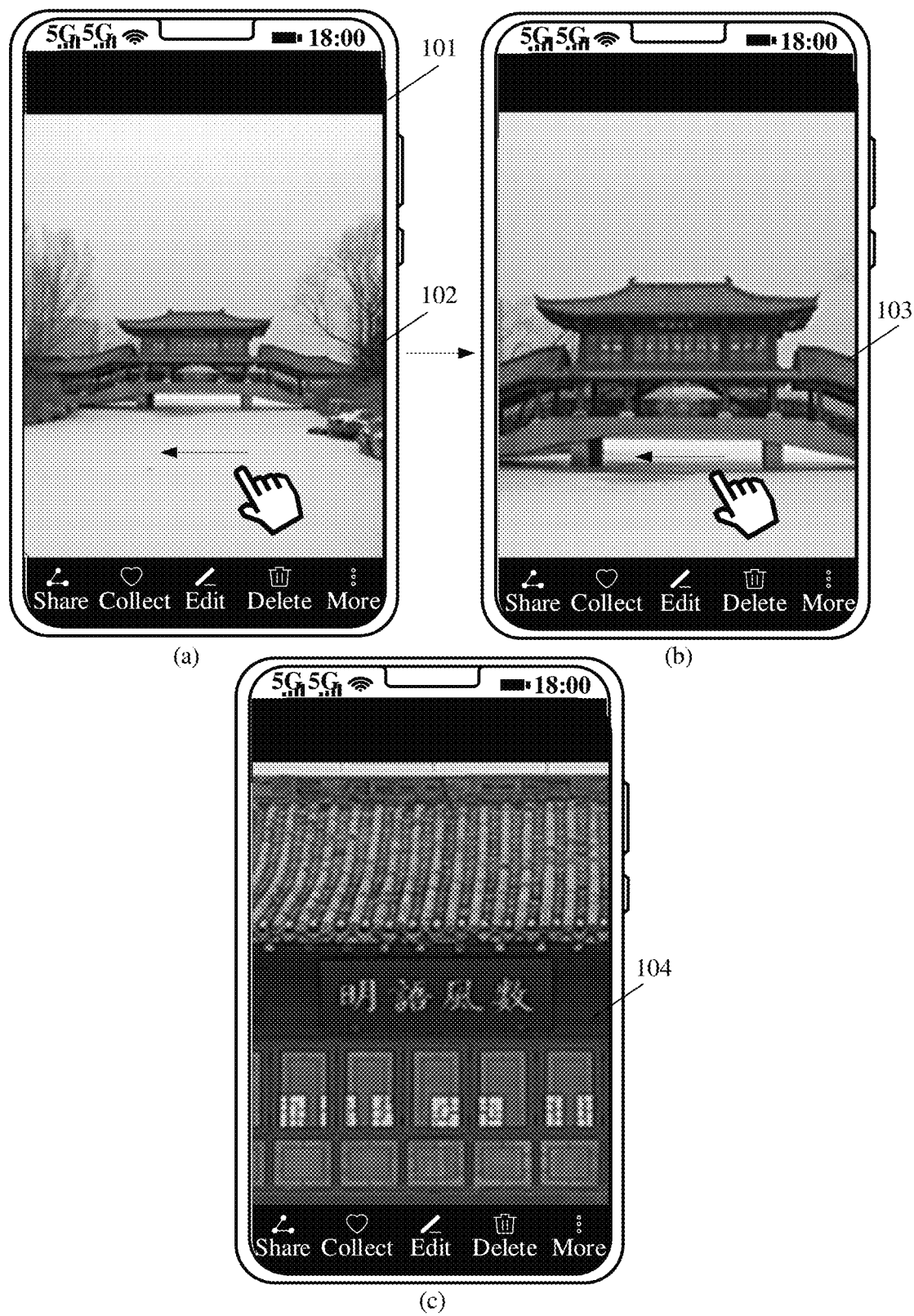
FIG. 1 is a schematic diagram of an example of an image viewing interface according to an embodiment of this application.

The following clearly and completely describes the technical solutions in the embodiments of this application with reference to the accompanying drawings in the embodiments of this application. Apparently, the described embodiments are some of the embodiments of this application rather than all of the embodiments. Based on the embodiments in the application, all other embodiments obtained by a person skilled in the art without paying any creative efforts all fall within the protection scope of the application.

The character "/" in this application generally indicates an "or" relationship between the associated objects. For example, A/B may be understood as A or B.

The terms "first" and "second" are used for descriptive purposes only and should not be construed as indicating or implying relative importance or implicitly indicating the number of technical features indicated. Therefore, features defining "first" and "second" may explicitly or implicitly include one or more such features. In the description of the embodiments, unless otherwise stated, "a plurality of" means two or more.

Moreover, the terms "comprising/including" and "having" and any variations thereof in the description of this application are intended to cover non-exclusive inclusions. For example, processes, methods, systems, products, or devices including a series of steps or modules is not limited to the listed steps or modules, but instead, optionally include other steps or modules not listed, or optionally include other steps or modules inherent to these processes, methods, products, or devices.

In addition, in the embodiments of this application, the terms such as "exemplary" and "example" are used to represent giving an example, an illustration or a description. Any embodiment or design scheme described as an "exemplary" or "for example" in this application should not be explained as being more preferred or having more advantages than another embodiment or design scheme. In particular, the terms such as "exemplary" and "example" as used herein are intended to present the concept in a specific implementation.

In order to facilitate understanding of the technical solutions of this application, before the detailed description of the image display method in the embodiments of this application, technical terms mentioned in the embodiments of this application are first described.

1. Super-Resolution Reconstruction.

Super-resolution reconstruction means generating a high-quality and high-resolution image by using a low-quality and low-resolution image or a group of low-quality and low-resolution images. Super-resolution reconstruction may include a reconstruction-based method or a learning-based method.

2. Image Signal Processing (Image Signal Processing, ISP) Module.

After a camera acquires an original image (that is, an image a RAW format), an electronic device may transmit the original image to the ISP module. The RAW format is a format before processing and compression. Then the ISP module may analyze the original image, and determines density gap between adjacent pixels in the image. Next, the ISP module may properly adjust the original image by using a preset adjustment algorithm in the ISP module, so as to improve quality of the image acquired by the camera.

After description of the technical terms mentioned in the embodiments of this application, a conventional technology is described below.

As the technology of electronics develops, electronic devices (such as mobile phones, tablet computes, or smart watches) have increasing functions. For example, in a mobile phone, a plurality of cameras such as a main camera, a telephoto camera, and a wide-angle camera may be mounted. The mobile phone can capture images in a same image capture scenario by using different cameras, so as to obtain images with different characteristics.

In the conventional technology, when a user captures different images (such as a main image, a telephoto image, and a wide-angle image) in a same scenario by using an electronic device, the user needs to switch an image capture mode of the electronic device to obtain different images in the same scenario. The main image is an image captured by the electronic device by using a main camera, the telephoto image is an image acquired by the electronic device by a telephoto camera, and the wide-angle image is an image acquired by the electronic device by a wide-angle camera. Moreover, after the electronic device captures the main image, the telephoto image, and the wide-angle image, the electronic device is required to display the images with different characteristics in response to the switching operation of the user.

For example, as shown in (a) in FIG. 1, an electronic device displays an image display interface 101. The image display interface 101 includes a wide-angle image 102. In response to a switching operation (for example, a leftward slide operation) of a user, the electronic device may switch the displayed wide-angle image 102 to a main image 103 shown in (b) in FIG. 1. Then, in response to a switching operation, the electronic device may switch the displayed main image 103 to a telephoto image 104 shown in (c) in FIG. 1.

However, in the above solution, the electronic device is required to make responses to a plurality of operations of the user to capture a plurality of images with different characteristics. In addition, the electronic device is required to perform switching between the displayed images so that the user can view the images with different characteristics on the mobile phone.

An embodiment of this application further provides an image display method. In this method, the electronic device can capture a first image and a second image by using different cameras in response to one photographing operation of the user. A viewfinder coverage of the first image is larger than a viewfinder coverage of the second image. In this way, the electronic device can obtain a plurality of images with different characteristics in response to only one operation of the user, thereby simplifying the image capture process of the electronic device.

Moreover, when the electronic device displays the first image, if the electronic device receives an operation of increasing a magnification factor of the first image, the electronic device may display the second image over the first image. In this way, the electronic device can display the first image and the second image simultaneously, so that the user can view the images with different characteristics simultaneously, thereby improving user experience.

It should be noted that, in this embodiment of this application, the image acquired by the electronic device by using the camera may be an image obtained after the ISP module adjusts the original image acquired by the camera. For example, the image acquired by the electronic device by using the main camera is an image obtained after the ISP module adjusts the original image acquired by the main camera. The image acquired by the electronic device by using the telephoto camera is an image obtained after the ISP module adjusts the original image acquired by the telephoto camera. The image acquired by the electronic device by using the wide-angle camera is an image obtained after the ISP module adjusts the original image acquired by the wide-angle camera. Optionally, the image acquired by the electronic device by using the camera in this embodiment of this application may be an image in a RAW format (that is, an original image). This is not limited in this embodiment of this application. The image in the RAW format is an image in which original information of a camera sensor and some metadata (an ISO setting, a shutter speed, an aperture value, white balance, and the like) generated during image capture by the camera is recorded and that is not processed by the IPS module. ISO is an acronym for International Organization for Standardization (International Organization for Standardization).

For example, the electronic device in this embodiment of this application may be a tablet computer, a mobile phone, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)\virtual reality (virtual reality, VR) device, or an on-board device. A specific form of the electronic device is not particularly limited in this embodiment of this application.

Figure 2A:
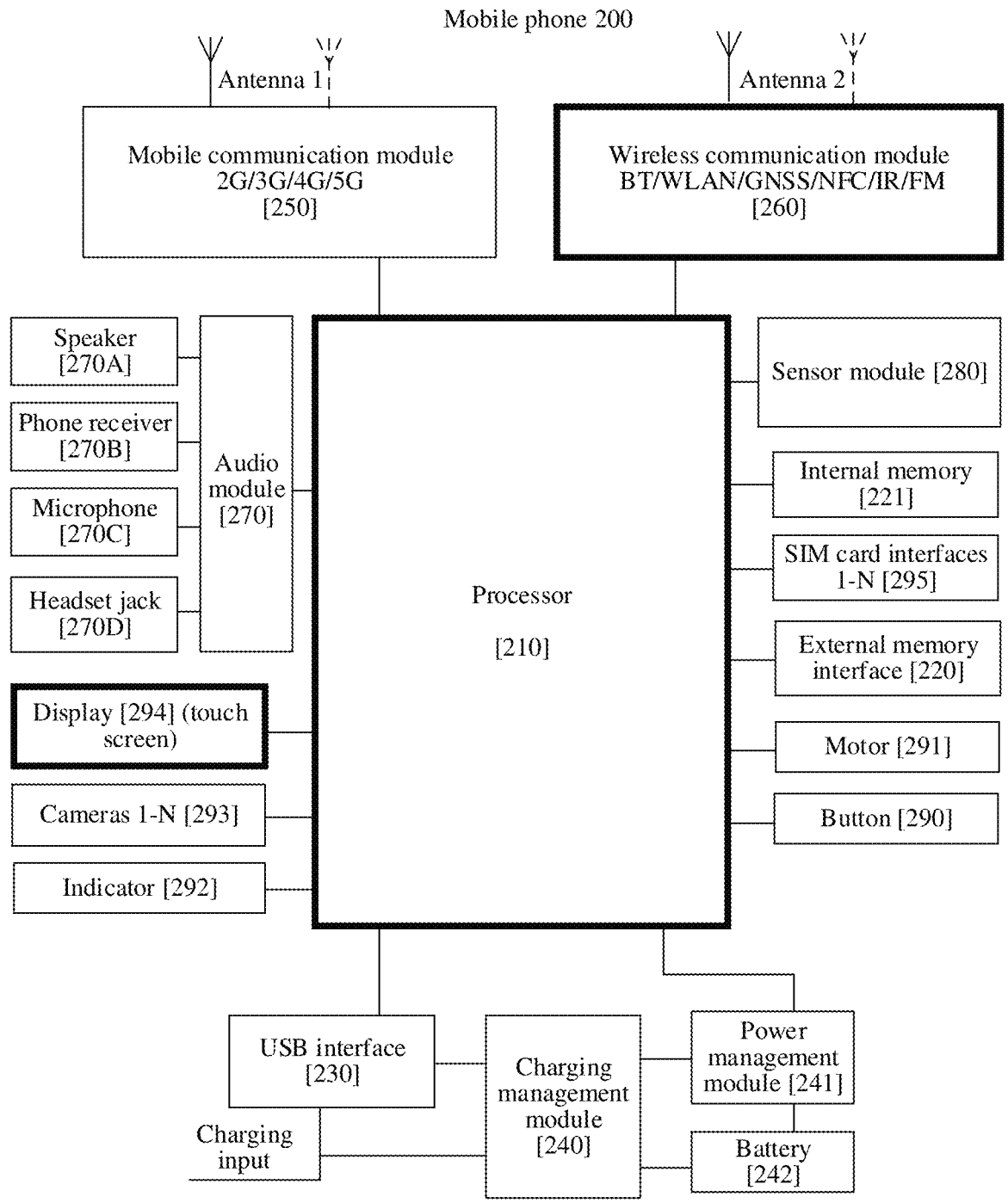
FIG. 2A is a schematic structural diagram of hardware of an electronic device according to an embodiment of this application.

An execution subject of the image display method provided in this application may be an image display apparatus, and the execution apparatus may be the electronic device shown in FIG. 2A. In addition, the execution apparatus may alternatively be a central processing unit (Central Processing Unit, CPU) of the electronic device or a control module in the electronic device configured to fuse images. In this embodiment of this application, an example that the image display method is performed by the electronic device is used for describing the image display method provided in this embodiment of this application.

Referring to FIG. 2A, in this application, the electronic device provided in this application is described by using an example that the electronic device is a mobile phone 200 shown in FIG. 2A. The mobile phone 200 shown in FIG. 2A is merely an example of the electronic device. The mobile phone 200 may have more or fewer components than those shown in the figure, or may have a combination of two or more components, or may have different component configurations. Various components shown in FIG. 2A may be implemented in hardware including one or more signal processing circuits and/or application-specific integrated circuits, software, or a combination of hardware and software.

As shown in FIG. 2A, the mobile phone 200 may include: a processor 210, an external memory interface 220, an internal memory 221, a universal serial bus (universal serial bus, USB) interface 230, a charging management module 240, a power management unit 241, a battery 242, an antenna 1, an antenna 2, a mobile communication module 250, a wireless communication module 260, an audio module 270, a speaker 270A, a phone receiver 270B, a microphone 270C, a headset jack 270D, a sensor module 280, a key 290, a motor 291, an indicator 292, a camera 293, a display 294, a subscriber identity module (subscriber identification module, SIM) card interface 295, and the like.

The sensor module 280 may include sensors such as a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like.

The processor 210 may include one or more processing units. For example, the processor 210 may include a memory, a video codec, a baseband processor, and/or a neural-network processing unit (neural-network processing unit, NPU). Different processing units may be independent devices, or may be integrated into one or more processors.

The controller may be a neural center and command center of the mobile phone 200. The controller may generate an operating control signal according to an instruction operation code and a sequence signal, to complete control of fetching and executing an instruction.

A memory may be further configured in the processor 210, to store an instruction and data. In some embodiments, the memory in the processor 210 is a cache memory.

In some embodiments, the processor 210 may include one or more interfaces. The interfaces may include an inter-integrated circuit (inter-integrated circuit, I2C) interface, a subscriber identity module (subscriber identity module, SIM) interface, and/or a universal serial bus (universal serial bus, USB) interface, and the like.

It may be understood that a schematic interface connection relationship between the modules in this embodiment is merely an example for description, and constitutes no limitation on the structure of the mobile phone 200. In some other embodiments, the mobile phone 200 may alternatively use an interface connection manner different from that in the foregoing embodiment, or use a combination of a plurality of interface connection manners.

The charging management module 240 is configured to receive a charging input from a charger. The charger may be a wireless charger or a wired charger. The charging management module 240 may supply power to the electronic device by using the power management module 241 while charging the battery 242.

The power management module 241 is configured to connect to the battery 242, the charging management module 240, and the processor 210. The power management module 241 receives an input of the battery 242 and/or the charging management module 240, to supply power to the processor 210, the internal memory 221, an external memory, the display 294, the camera 293, the wireless communication module 260, and the like. In some embodiments, the power management module 241 and the charging management module 240 may further be arranged in the same device.

A wireless communication function of the mobile phone 200 may be implemented by using the antenna 1, the antenna 2, the mobile communication module 250, the wireless communication module 260, the modem processor, the baseband processor, and the like. In some embodiments, the antenna 1 and the mobile communication module 250 of the mobile phone 200 are coupled, and the antenna 2 and the wireless communication module 260 of the mobile phone 200 are coupled, so that the mobile phone 200 can communicate with a network and another device by using a wireless communication technology.

The antenna 1 and the antenna 2 are configured to transmit or receive an electromagnetic wave signal. Each antenna in the mobile phone 200 may be configured to cover one or more communication frequency bands. Different antennas may also be multiplexed to improve utilization of the antennas. The mobile communication module 250 may provide a solution to wireless communication such as 2G/3G/4G/5G applied to the mobile phone 200. The mobile communication module 250 may include at least one filter, a switch, a power amplifier, a low noise amplifier (low noise amplifier, LNA), and the like. The mobile communication module 250 may further amplify a signal modulated by the modem processor, and convert the signal into an electromagnetic wave for radiation through the antenna 1. In some embodiments, at least some function modules of the mobile communication module 250 may be disposed in the processor 210.

The wireless communication module 260 can provide wireless communication solutions applicable to the mobile phone 200, such as a wireless local area network (wireless local area networks, WLAN) (such as a (wireless fidelity, Wi-Fi) network), frequency modulation (frequency modulation, FM), or infrared (infrared, IR). For example, in this embodiment of this application, the mobile phone 200 may be connected to the Wi-Fi network through the wireless communication module 260. The wireless communication module 260 may be one or more components into which at least one communication processing module is integrated.

The mobile phone 200 implements a display function by using the GPU, the display 294, the AP, and the like. The GPU is a microprocessor for image processing, and is connected to the display 294 and the application processor.

The display 294 is configured to display an image, a video, and the like. The display 294 includes a display panel. For example, in this embodiment of this application, the display 294 may be configured to display an album interface, an image capture interface, and the like.

The mobile phone 200 may implement a photographing function by using the ISP module, the camera 293, the video codec, the GPU, the display 294, the AP, and the like. The ISP module is configured to process data fed back by the camera 293. The camera 293 is configured to capture a static image or a video. In some embodiments, the mobile phone 200 may include one or N cameras 293, and N is a positive integer greater than 1.

In this embodiment of this application, the N cameras 293 may include a main camera, a telephoto camera, and a wide-angle camera. Optionally, the N cameras 293 may further include at least one camera such as an infrared camera, a depth camera, or a black and white camera. Characteristics (that is, advantages and disadvantages) and proper scenarios of each of the above cameras are briefly described below.

(1) Main camera. The main camera has a large amount of incident light, a high resolution, and a medium field of view. The main camera is usually used as a default camera of an electronic device (such as a mobile phone). That is to say, the electronic device (such as a mobile phone) may start the main camera by default in response to an operation of starting a "camera" application performed by a user, and display an image acquired by the main camera on a preview interface.

(2) Telephoto camera. The telephoto camera has a relatively large focal length and may be configured to capture an image of an object for image capture far away from the mobile phone (that is, an object in the distance). However, the telephoto camera has a relatively small amount of incident light. Due to the insufficient amount of incident light, capturing images in a low-light scenario by using the telephoto camera may affect quality of the images. Moreover, the telephoto camera has a relatively small field of view, and is inapplicable to image capture in relatively large scenarios, that is, inapplicable to image capture of relatively large objects (such as buildings or landscapes).

(3) Wide-angle camera. The wide-angle camera has a relatively large field of view and is applicable to image capture of relatively large objects (such as landscapes). However, a focal length of the wide-angle camera is relatively small. When the wide-angle camera captures an image of an object at a short distance, the object in the captured wide-angle image is prone to distortion (for example, the object in the image becomes wider and flatter than the original object).

(4) Black and white camera. Since the black and white camera has no filter, the black and white camera has a larger amount of incident light than a color camera, and has a larger focusing speed than the color camera. However, an image acquired by the black and white camera can merely show different grayscale levels, and cannot show a true color of an object for image capture. It should be noted that the above main camera and telephoto camera are both color cameras.

It should be noted that, a field of view in this embodiment of this application includes a horizontal field of view and a vertical field of view.

It should be noted that the mobile phone 200 may have a plurality of image capture modes. For example, the plurality of image capture modes include a wide-angle image capture mode, a normal image capture mode, and a telephoto image capture mode. The mobile phone 200 capture images by using different cameras in different image capture modes. For example, when the image capture mode of the mobile phone 200 is the wide-angle image capture mode, the mobile phone 200 can acquire images by using the wide-angle camera and the main camera (or acquire images by using the wide-angle camera, the main camera, and the telephoto camera). For another example, when the image capture mode of the mobile phone 200 is the normal image capture mode, the mobile phone 200 can acquire images by using the main camera and the telephoto camera. For another example, when the image capture mode of the mobile phone 200 is the telephoto image capture mode, the mobile phone 200 can capture images by using the telephoto camera.

The external memory interface 220 may be configured to connect to an external storage card, for example, a micro SD card, to expand a storage capability of the mobile phone 200. The external storage card communicates with the processor 210 by using the external memory interface 220, to implement a data storage function, such as storing a file such as a music or a video in the external storage card.

The internal memory 221 may be configured to store computer executable program code, and the executable program code includes instructions. The processor 210 runs the instruction stored in the internal memory 221, to perform various function applications and data processing of the mobile phone 200. For example, in this embodiment of this application, the processor 210 may execute instructions stored in the internal memory 221, and the internal memory 221 may include a program storage area and a data storage area.

The program storage area may store an operating system, an application required by at least one function (for example, a sound playing function or an image playing function), and the like. The data storage region may store data (for example, audio data and an address book) and the like created when the mobile phone 200 is used. In addition, the internal memory 221 may include a high-speed random access memory, or may include a non-volatile memory such as at least one magnetic disk memory, a flash memory, or a universal flash storage (universal flash storage, UFS).

The mobile phone 200 may implement an audio function by using the audio module 270, the loudspeaker 270A, the phone receiver 270B, the microphone 270C, the headset jack 270D, the application processor, and the like, such as music playback and sound recording.

The key 290 includes a power key, a volume key, and the like. The key 290 may be a mechanical key, or a touch-type key. The motor 291 may generate a vibration prompt. The motor 291 may be configured to provide a vibration prompt for an incoming call, and may be further configured to provide a touch vibration feedback. The indicator 292 may be an indicator light, and may be configured to indicate a charging state or a battery change, or may be further configured to indicate a message, a missed call, a notification, or the like. The SIM card interface 295 is configured to connect to a SIM card. The SIM card may come into contact with and be separated from the mobile phone 200 by being inserted into the SIM card interface 295 or pulled out of the SIM card interface 295. The mobile phone 200 may support 1 or N SIM card interfaces, where N is a positive integer greater than 1. The SIM card interface 295 can support a Nano SIM card, a Micro SIM card, a SIM card, and the like.

Although not shown in FIG. 2A, the mobile phone 200 may use a flashlight, a pico-projection apparatus, a near field communication (Near Field Communication, NFC) device, and the like, and details are not described herein.

It may be understood that the schematic structure in this embodiment constitutes no specific limitation on the mobile phone 200. In some other embodiments, the mobile phone 200 may include more or fewer components than those shown in the figure, or some components may be combined, or some components may be split, or components are arranged in different manners. The components shown in the figure may be implemented by hardware, software, or a combination of software and hardware.

Methods in the following embodiments may all be implemented in the electronic device having the foregoing hardware structure. In the following embodiments, the method in this embodiment of this application is described by using the above electronic device having the above hardware structure as an example.

In some embodiments, the electronic device may include a first camera and a second camera. A field of view of the first camera is larger than a field of view of the second camera. Specifically, the field of view of the first camera being greater than the field of view of the second camera means that a horizontal field of view of the first camera is larger than a horizontal field of view of the second camera and a vertical field of view of the first camera is smaller than a vertical field of view of the second camera.

A viewfinder coverage in which the first camera acquires the first image is a first viewfinder coverage, and a viewfinder coverage in which the second camera acquires the second image is a second viewfinder coverage. The first viewfinder coverage is larger than the second viewfinder coverage.

Figure 2B:
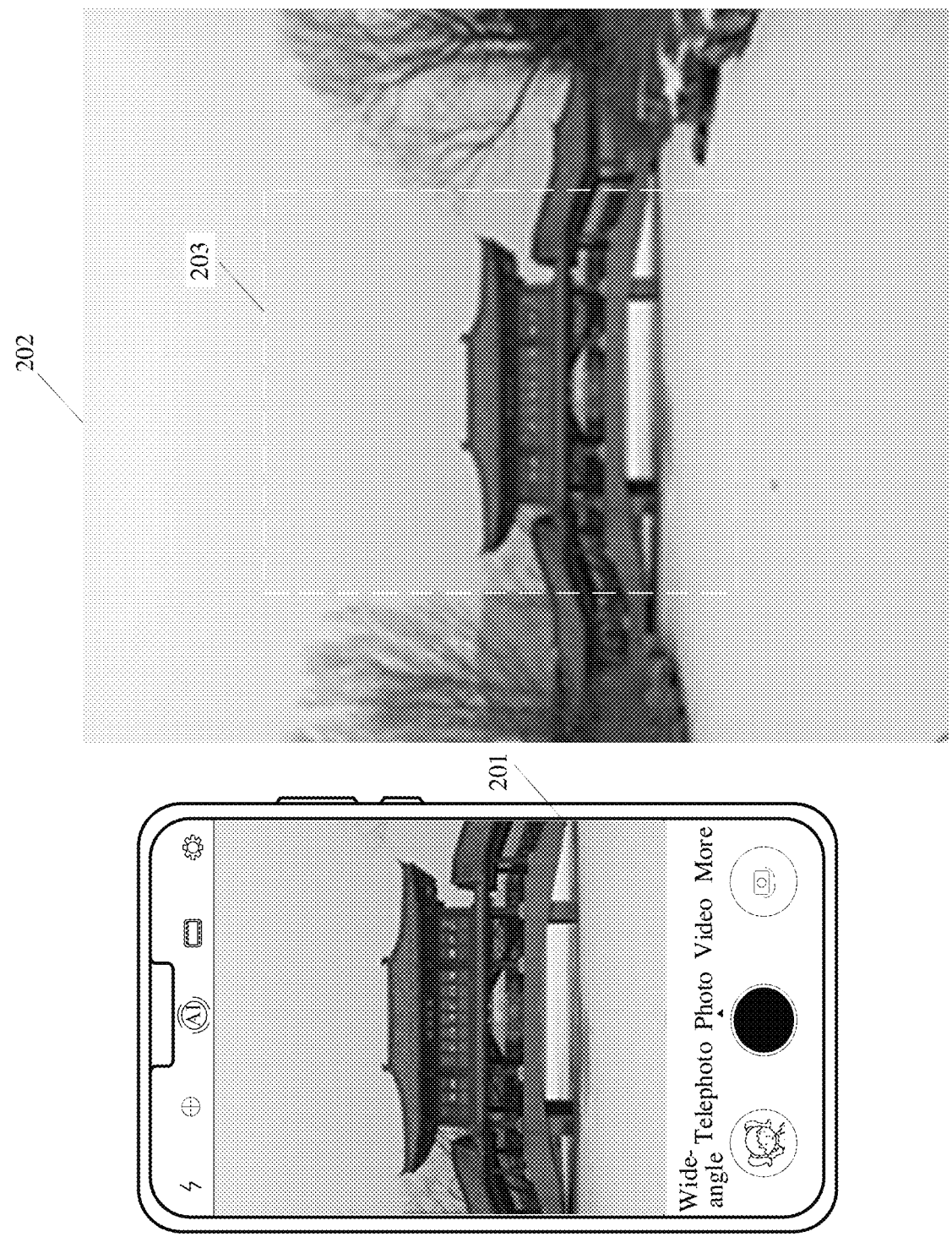
FIG. 2B is a schematic diagram of an example of a viewfinder coverage according to an embodiment of this application.

It should be noted that, in this embodiment of this application, the viewfinder coverage for image acquisition by the camera is a range of region where the camera can capture an image. For example, as shown in FIG. 2B, the main camera may acquire an image corresponding to a region 203 in a region 202. That is to say, regions of the region 202 except for the region 203 are not within the viewfinder coverage in which the main camera acquires the image. Moreover, in this embodiment of this application, the image viewfinder coverage corresponds to the viewfinder coverage in which the camera acquires the image. For example, the viewfinder coverage of the first image may indicate the viewfinder coverage (that is, the first viewfinder coverage) in which the first camera acquires the first image. For another example, the viewfinder coverage of the second image may indicate the viewfinder coverage (that is, the second viewfinder coverage) in which the second camera acquires the second image.

In this embodiment of this application, the first camera and the second camera may be combined in three manners, that is, a combination manner (1), a combination manner (2), and a combination manner (3). In the combination manner (1), the first camera may be the wide-angle camera, and the second camera may be the main camera. In the combination manner (2), the first camera may be the wide-angle camera, and the second camera may be the telephoto camera. In the combination manner (3), the first camera may be the main camera, and the second camera may be the telephoto camera. This embodiment of this application is described below in combination with the combination manner (1), the combination manner (2), and the combination manner (3).

Figure 3:
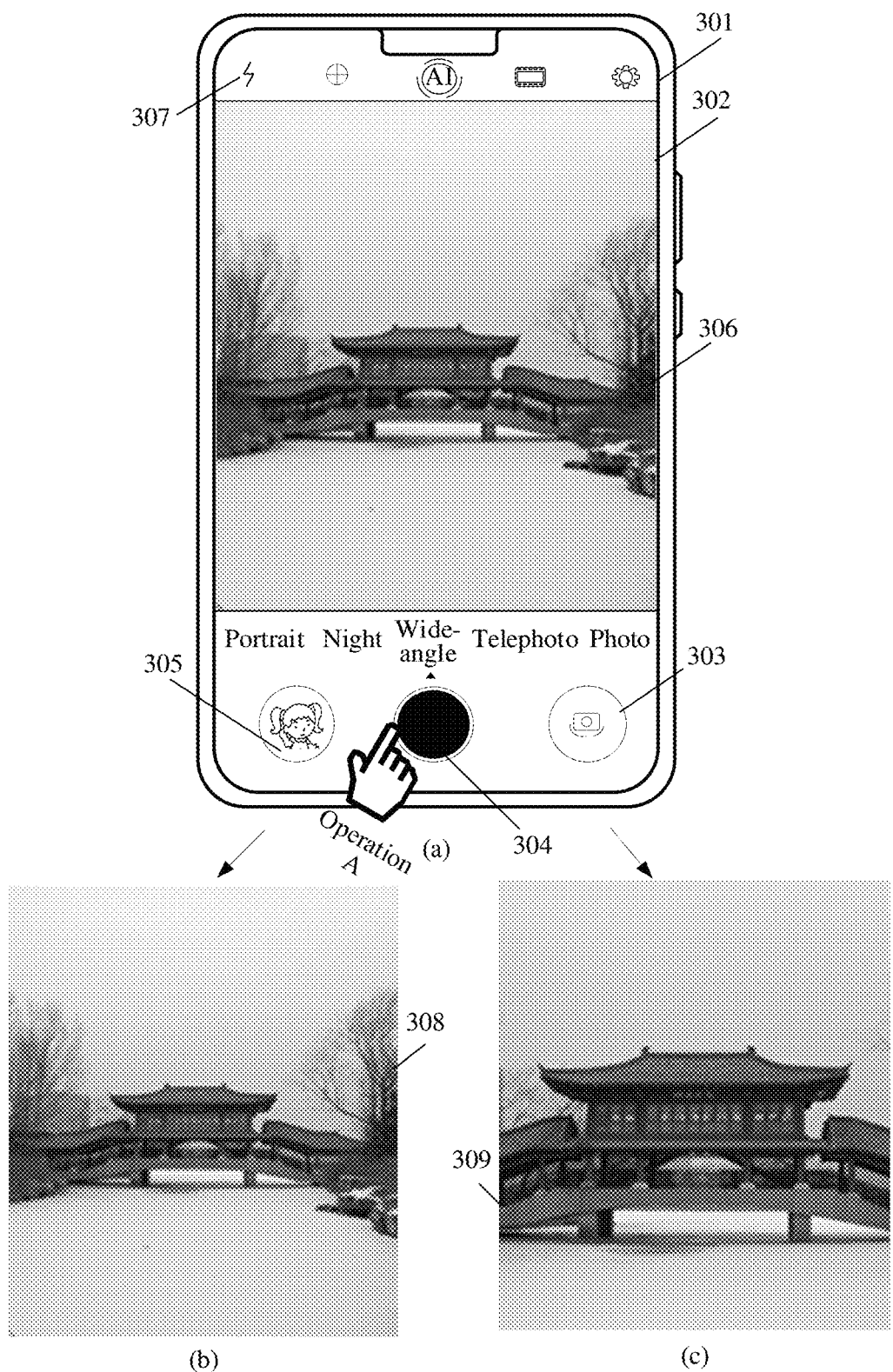
FIG. 3 is a schematic diagram of an example of an image preview interface according to an embodiment of this application.

In some embodiments, the first camera and the second camera may be combined in the combination manner (1), that is, the first camera may be the wide-angle camera, and the second camera may be the main camera. The electronic device may start an image capture application to display an image preview interface (that is, a first interface). The image preview interface is a viewfinder interface for image capture by the electronic device, and the image preview interface includes a first image acquired by the wide-angle camera. For example, as shown in (a) in FIG. 3, after the electronic device starts the image capture application, an image capture mode of the electronic device is the wide-angle image capture mode. The electronic device may display an image preview interface 301. The image preview interface 301 includes a viewfinder frame 302, a camera conversion button 303, an image capture button 304, an album button 305, a preview image 306, a flash option 307, a "video" option, a "photo" option, a "more" option, and the like. The preview image 306 is an image acquired by the wide-angle camera. Optionally, the preview image 306 may be an image obtained after the electronic device performs image processing on a wide-angle image and a main image (for details, refer to the following description, and the details are not described in detail herein). Then the electronic device may receive an image capture operation of a user. In response to the image capture operation performed by the user on the image preview interface, the electronic device may acquire a first image (that is, the wide-angle image) by using the wide-angle camera and acquire a second image (that is, the main image) by using the main camera at the same moment. A viewfinder coverage of the wide-angle image is larger than a viewfinder coverage of the main image. For example, a wide-angle image 308 shown in (b) in FIG. 3 is an image acquired by the wide-angle camera, and a main image 309 shown in (c) in FIG. 3 is an image acquired by the main camera. A viewfinder coverage of the wide-angle image 308 is larger than a viewfinder coverage of the main image 309.

It should be noted that the above expression that electronic device acquires the wide-angle image by using the wide-angle camera and acquires the main image by using the main camera at the same moment means that a moment (such as a first moment) at which the wide-angle camera acquires the wide-angle image and a moment (such as a second moment) at which the main camera acquires the main image are the same or a time difference between the first moment and the second moment is relatively small (for example, the time difference is less than 1 millisecond, 0.5 milliseconds, or 2 milliseconds). When a time difference exists between the first moment and the second moment, whether the wide-angle camera acquires the wide-angle image first or the main camera acquires the main image first is not limited in this embodiment of this application.

In this embodiment of this application, in response to the image capture operation (also referred to as a first operation), the electronic device may save the wide-angle image and the main image after acquiring the wide-angle image by using the wide-angle camera and acquiring the main image by using the main camera. The electronic device may save the wide-angle image and the main image in a manner (a) and a manner (b) respectively. In the manner (a), the electronic device saves the wide-angle image in a visible form and saves the main image in an invisible form. In the manner (b), the wide-angle image and the main image are saved in a visible form.

Figure 4A:
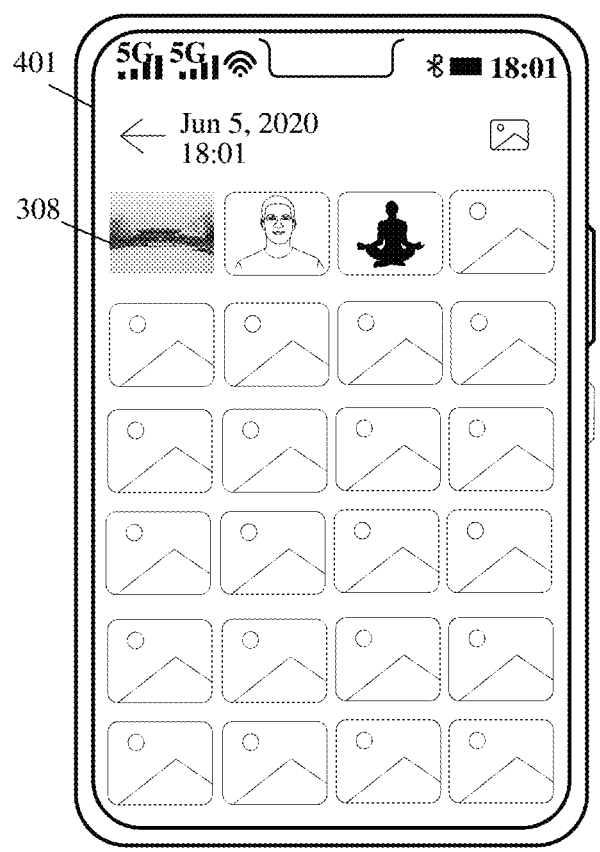
FIG. 4A is a schematic diagram of an example of an image saving interface according to an embodiment of this application.

In a possible design, the electronic device saves the wide-angle image and the main image in the manner (a), that is, the electronic device saves the wide-angle image in a visible form and saves the main image in an invisible form. For example, as shown in FIG. 4A, the electronic device may display an album interface 401. The album interface 401 includes the wide-angle image 308, and the album interface 401 does not display the main image.

Figure 4B:
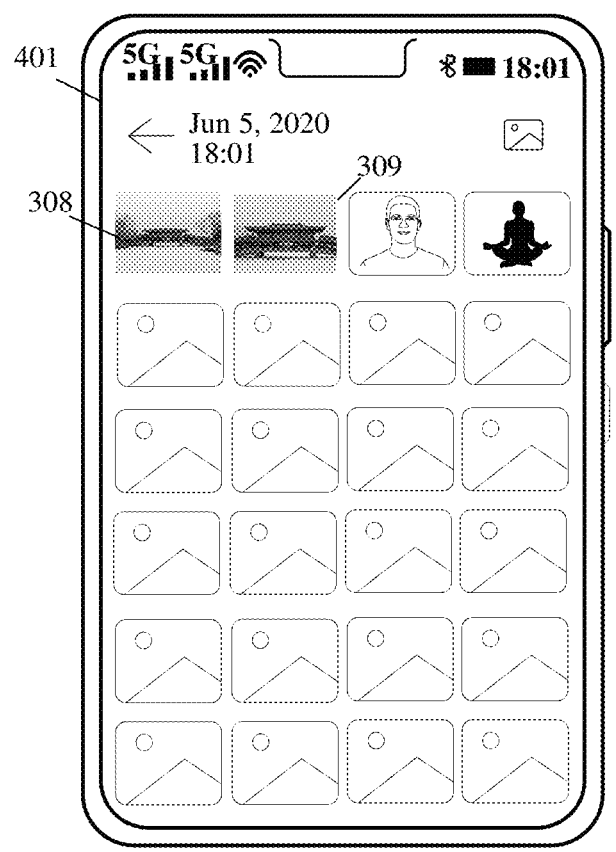
FIG. 4B is a schematic diagram of an example of another image saving interface according to an embodiment of this application.

In another possible design, the electronic device saves the wide-angle image and the main image in the manner (b), that is, the electronic device saves the wide-angle image and the main image in a visible form. For example, as shown in FIG. 4B, the album interface 401 displayed by the electronic device includes the wide-angle image 308 and the main image 309. In the following embodiments, this embodiment of this application is described by using an example that the electronic device saves the wide-angle image and the main image in the manner (a).

Figure 5:
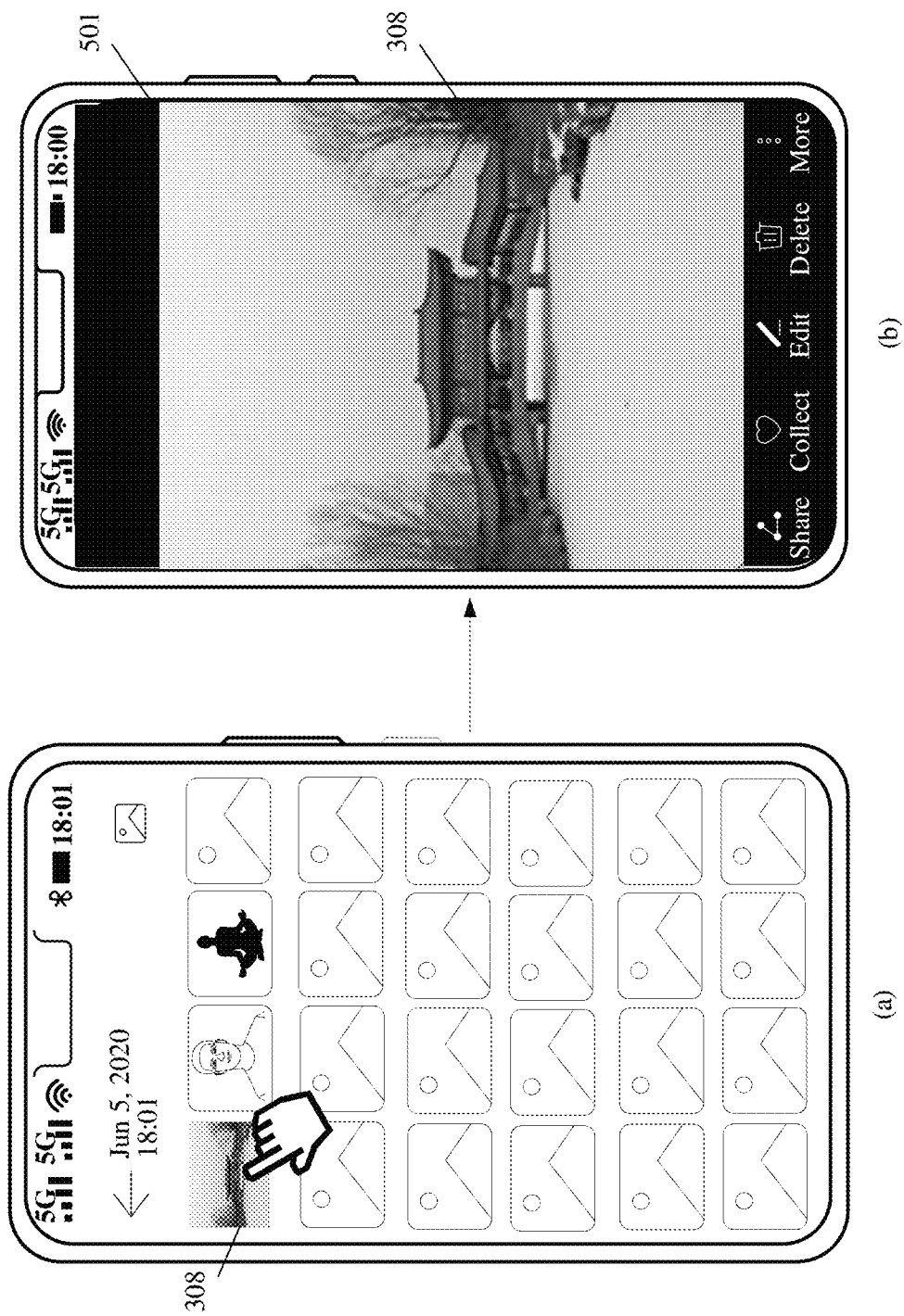
FIG. 5 is a schematic diagram of an example of image displaying according to an embodiment of this application.

In this embodiment of this application, the electronic device may receive a second operation, where the second operation is used for triggering the electronic device to display the wide-angle image. In response to the second operation, the electronic device displays the wide-angle image. For example, as shown in (a) in FIG. 5, the electronic device may receive an operation (such as a tap operation) performed by the user on the wide-angle image 308, and display an image viewing interface 501 shown in (b) in FIG. 5. The image viewing interface 501 includes the wide-angle image 308. Optionally, the electronic device may splice the main image to a second target region image in the wide-angle image for displaying in response to the second operation, where a viewfinder coverage of the second target region image relative to the first camera coincides with the second viewfinder coverage. That is to say, in response to the second operation, the electronic device may display the image obtained after splicing the wide-angle image and the main image.

Then the electronic device may receive a third operation, where the third operation is used for triggering the electronic device to display a first region image in a magnified wide-angle image. The first region image includes a first target region image, and a viewfinder coverage of the first target region image relative to the wide-angle camera is a third viewfinder coverage (that is, the first camera can obtain the first target region image by using the third viewfinder coverage). The first viewfinder coverage includes the third viewfinder coverage, and the third viewfinder coverage coincides with the second viewfinder coverage. For example, the first viewfinder coverage is a viewfinder coverage of the wide-angle image 308 shown in (a) in FIG. 6, and the third viewfinder coverage is a viewfinder coverage of a first target region image 604 shown in (b) in FIG. 6. In the following embodiments, for description of the viewfinder coverage of the region image, refer to the description of the viewfinder coverage of the first target region image.

Figure 6:
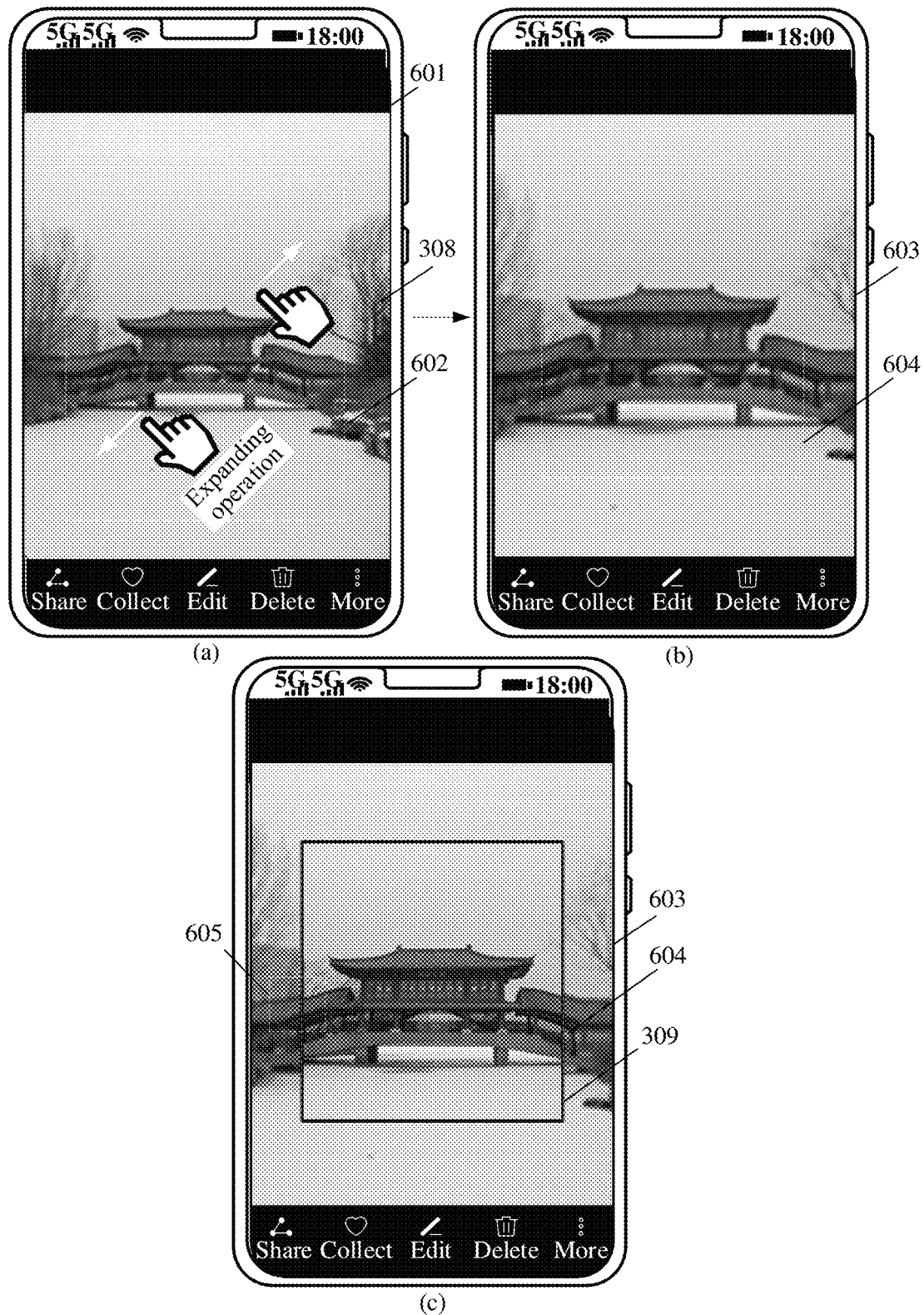
FIG. 6 is a schematic diagram of an example of another image viewing interface according to an embodiment of this application.

For example, as shown in (a) in FIG. 6, an image viewing interface 601 displayed by the electronic device includes the wide-angle image 308. The electronic device may receive a third operation (such as an expanding operation) performed by the user on the image viewing interface 601, to trigger the electronic device to display an image 603 shown in (b) in FIG. 6. The image 603 is a region in a magnified wide-angle image 308, and a viewfinder coverage of the image 603 is the same as a viewfinder coverage of a region image 602 in the wide-angle image 308. That is to say, the image 603 is a magnified region image 602. The image 603 includes the first target region image 604, and the viewfinder coverage of the first target region image 604 is the same as the viewfinder coverage of the main image (for example, the main image 309 shown in (c) in FIG. 3).

It should be noted that, due to a low resolution of the first region image, in a case that the electronic device displays the first region image in the magnified wide-angle image, quality of the image displayed by the electronic device is poor. As a result, the user cannot view a high-quality image.

In some embodiments, in order to improve the quality of the image displayed by the electronic device, the electronic device may splice the main image to the first target region image for displaying in response to the third operation. That is to say, in response to the third operation, the electronic device may display a region in the first region image except for the first target region image and the main image. For example, as shown in (c) in FIG. 6, the electronic device may splice the main image 309 to the first target region image 604 of the image 603 for displaying.

It may be understood that, after receiving the third operation of the user, the electronic device may splice the main image to the first target region image for displaying. In this way, the electronic device can simultaneously display a partial region in the wide-angle image and the main image. Compared with the conventional technical solution, the technical solution of this application can simplify the process of displaying images with different characteristics by the electronic device, thereby improving user experience.

In a possible implementation, the electronic device stores calibration information. The calibration information includes a relationship between a field of view of the wide-angle camera and a field of view of the main camera and a correspondence between the viewfinder coverage of the main image and the viewfinder coverage of the wide-angle image. In response to the third operation, the electronic device may render and display the main image in the first target region image according to the calibration information.

For example, in this embodiment of this application, the electronic device may determine the first target region image by using the following implementation. The electronic device may store two-dimensional coordinates of two opposite corners (such as an upper left corner and a lower right corner or an upper right and a lower left corner) in the viewfinder coverage of the main image in a coordinate system of the viewfinder coverage of the wide-angle image. The two-dimensional coordinates can reflect the correspondence between the viewfinder coverage of the main image and the viewfinder coverage of the wide-angle image. A coordinate origin of the coordinate system of the viewfinder coverage of the wide-angle image is any corner (such as an upper left corner or a lower left corner) of the viewfinder coverage of the wide-angle image, and an x axis and a y axis are two adjacent sides.

Figure 7:
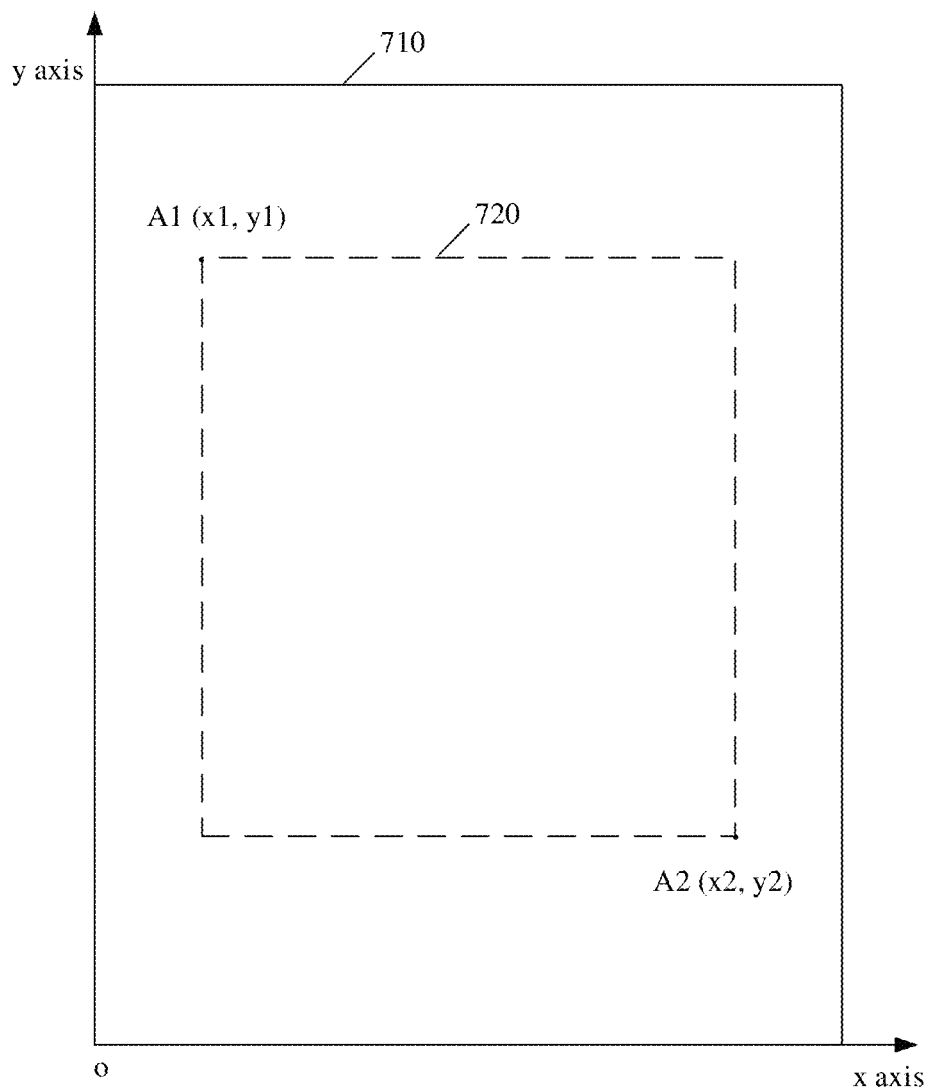
FIG. 7 is a schematic diagram of an example of an image viewfinder coverage according to an embodiment of this application.

FIG. 7 shows an example of a coordinate system of a viewfinder coverage 710 of the wide-angle image. As shown in FIG. 7, a point o is the coordinate origin, the x axis is a lower side of the viewfinder coverage 710, and the y axis is a left side of the viewfinder coverage 710. The electronic device may store two-dimensional coordinates A1 (x1, y1) and A2 (x2, y2) of an upper left corner A1 and a lower right corner A2 of a viewfinder coverage 720 of the main image in the xoy coordinate system shown in FIG. 7. The two-dimensional coordinates A1 (x1, y1) and A2 (x2, y2) can reflect the correspondence between the viewfinder coverage of the main image and the viewfinder coverage of the wide-angle image.

It may be understood that, after receiving the third operation, the electronic device may display the region in the first region image except for the first target region image and the main image. In this way, the electronic device can display characteristics of both the wide-angle image and the main image in one image, thereby ensuring that the user can view the wide-angle image and the main image simultaneously. Moreover, since the image quality of the main image is higher than image quality of the first target region image, and the viewfinder coverage of the main image is the same as the viewfinder coverage of the first target region image, the quality of the image viewed by the user can be improved, thereby improving user experience.

It should be noted that, in order to further improve operability for the user, the electronic device may control a timing at which the electronic device splices the main image to the first target region image for displaying. Specifically, the electronic device may control, by using a method (a) and a method (b), the timing at which the electronic device splices the main image to the first target region image for displaying. In the method (a), the electronic device controls, by using a resolution of the image and a resolution of a display, the timing at which the electronic device splices the main image to the first target region image for displaying. In the method (b), the electronic device may control, according to a magnification factor of the image, the timing at which the electronic device splices the main image to the first target region image for displaying.

In some embodiments, the electronic device may control, by using the method (a), that is, by using the resolution of the image and the resolution of the display, the timing at which the electronic device splices the main image to the first target region image for displaying. Specifically, the electronic device may obtain a resolution of the first region image in the magnified wide-angle image and the resolution of the display. Then the electronic device may calculate a first ratio according to the resolution of the first region image and the resolution of the display, where the first ratio is a ratio of the resolution of the first region image to the resolution of the display.

For example, the electronic device may calculate the first ratio by using a formula I.

$$N = \frac{C}{A}. \qquad \text{Formula I}$$

N represents the first ratio, C represents the resolution of the display of the electronic device, and A represents the resolution of the first region image.

For example, if the resolution of the display of the electronic device is 2000×1000 and the resolution of the first region image is 2500×1000, the first ratio is:

$$N = \frac{2000 \times 1000}{2500 \times 1000}$$
$$= 0.8.$$

That is to say, the first ratio is 0.8.

It should be noted that the electronic device stores a ratio of an area of the first region image to an area of the magnified wide-angle image. The electronic device may determine the resolution of the first region image according to a resolution of the wide-angle image and the ratio of the area of the first region image to the area of the magnified wide-angle image. A larger magnification factor of the wide-angle image leads to a smaller ratio of the area of the first region image to the area of the magnified wide-angle image. For example, the ratio of the area of the first region image to the area of the magnified wide-angle image is 0.8, the resolution of the wide-angle image is 4000×3000, and the resolution of the first region image is 3200×2400.

The electronic device may determine, according to the first ratio and a first preset ratio, whether to splice the main image to the first target region image for displaying. The first preset ratio is greater than 0.5 and less than 0.95. This embodiment of this application is described below by using an example that the first preset ratio is 0.8.

In a possible design, if the first ratio is greater than the first preset ratio, the electronic device may splice the main image to the first target region image for displaying. If the first ratio is less than the first preset ratio, the electronic device displays only the first region image without splicing the main image to the first target region image for displaying. For example, if the first ratio is 0.85, the electronic device may splice the main image to the first target region image for displaying (for example, (c) in FIG. 6). If the first ratio is 0.75, the electronic device displays only the first region image (for example, (b) in FIG. 6).

It should be noted that, a larger magnification factor of the wide-angle image leads to a smaller ratio of the area of the first region image to the area of the magnified wide-angle image, and a smaller ratio of the area of the first region image to the area of the magnified wide-angle image leads to a smaller resolution of the first region image. Moreover, in a case that the resolution of the display of the electronic device is constant, a smaller resolution of the first region image is leads to a larger first ratio, and thereby leads to a larger possibility that the electronic device splices the main image to the first target region image for displaying. That is to say, in a case that the magnification factor of the wide-angle image is larger, the probability that the electronic device splices the main image to the first target region image is larger.

It may be understood that, by comparing the first ratio with the first preset ratio, the electronic device may control the timing of splicing the main image to the first target region image for displaying. In this way, the electronic device can display the main image in a preset condition, thereby improving user experience.

In some embodiments, the electronic device may control, by using the method (b), that is, according to the magnification factor of the image, the timing at which the electronic device splices the main image to the first target region image for displaying. Specifically, the electronic device may obtain a first factor. The first factor is a magnification factor after the third operation triggers the electronic device to magnify the wide-angle image (that is, the magnification factor of the magnified wide-angle image, for example, a magnification factor of the image 603).

The electronic device may obtain the first factor in the following manner. Specifically, the electronic device may obtain the magnification factor of the wide-angle image (that is, a magnification factor of the unmagnified wide-angle image, such as the wide-angle image 308), the resolution of the wide-angle image (such as a resolution of the wide-angle image 308), and the resolution of the first region image (such as a resolution of image 603). Then the electronic device may calculate the first factor according to the magnification factor of the wide-angle image, the resolution of the wide-angle image, and the resolution of the first region image. For example, the electronic device may calculate the first factor by using a formula II.

$$M = \sqrt{\frac{B}{A}} \times Z. \qquad \text{Formula II}$$

M represents the first factor, B represents the resolution of the wide-angle image, A represents the resolution of the first region image, and Z represents the magnification factor of the wide-angle image.

For example, if the resolution of the wide-angle image is 4000×3000, the resolution of the first region image is 3600×2700, and the magnification factor of the wide-angle image is 0.6, the first factor is:

$$M = \sqrt{\frac{4000 \times 3000}{3600 \times 2700}} \times 0.6$$
$$= 0.54.$$

That is to say, the first factor is 0.54.

It should be noted that the electronic device may alternatively calculate the first factor according to the magnification factor of the wide-angle image, pixels in a first direction in the wide-angle image, and pixels in a first direction in the first region image. The first direction may be a horizontal or vertical direction.

The electronic device may determine, according to the first factor and a first preset magnification factor, whether to splice the main image to the first target region image for displaying. The first preset magnification factor is greater than 0.7× and less than 0.95×. This embodiment of this application is described below by using an example that the first preset magnification factor is 0.9×.

In a possible design, if the first factor is greater than the first preset magnification factor, the electronic device may splice the main image to the first target region image for displaying. If the first factor is less than the first preset magnification factor, the electronic device displays only the first region image without splicing the main image to the first target region image for displaying. For example, if the first factor is 0.95×, the electronic device may splice the main image to the first target region image for displaying (for example, (c) in FIG. 6). If the first factor is 0.75×, the electronic device displays only the first region image (for example, (b) in FIG. 6).

It may be understood that, by comparing the first factor with the first preset magnification factor, the electronic device may control splicing of the main image to the first target region image for displaying. In this way, the electronic device can display the main image in a preset condition, thereby improving user experience.

Optionally, the main image may be spliced to the first target region image for saving after image capture. Only the spliced image may be saved, or the main image and the wide-angle image may be saved together with the spliced image.

In other embodiments, in response to the third operation, the electronic device may perform image fusion on the first region image and the second image (for example, the main image) to obtain a fourth image. Then the electronic device may display the fourth image.

It should be noted that the electronic device may control a timing of performing image fusion on the first region image and the main image. For details, refer to the description of controlling, by the electronic device, the timing of splicing the main image to the first target region image in the above embodiment. The details are not repeated herein.

It may be understood that, by image fusion, the image quality can be improved. Moreover, a larger viewfinder coverage of the first region image leads to higher image quality of the main image. During the image fusion of the main image and the first region image, the electronic device may combine characteristics of the main image and the first region image to obtain a fourth image with a relatively large viewfinder coverage and a relatively large local image definition. In this way, the quality of the image viewed by the user can be improved, thereby improving user experience.

It should be noted that, when the electronic device splices the main image to the first target region image for displaying, since the main image is spliced to the first target region image, abnormal phenomena such as image distortion and unevenness may occur at a splicing of the main image and the first region image (for example, a splicing region 605 shown in (c) in FIG. 6). As a result, user experience may be relatively poor.

Figure 8:
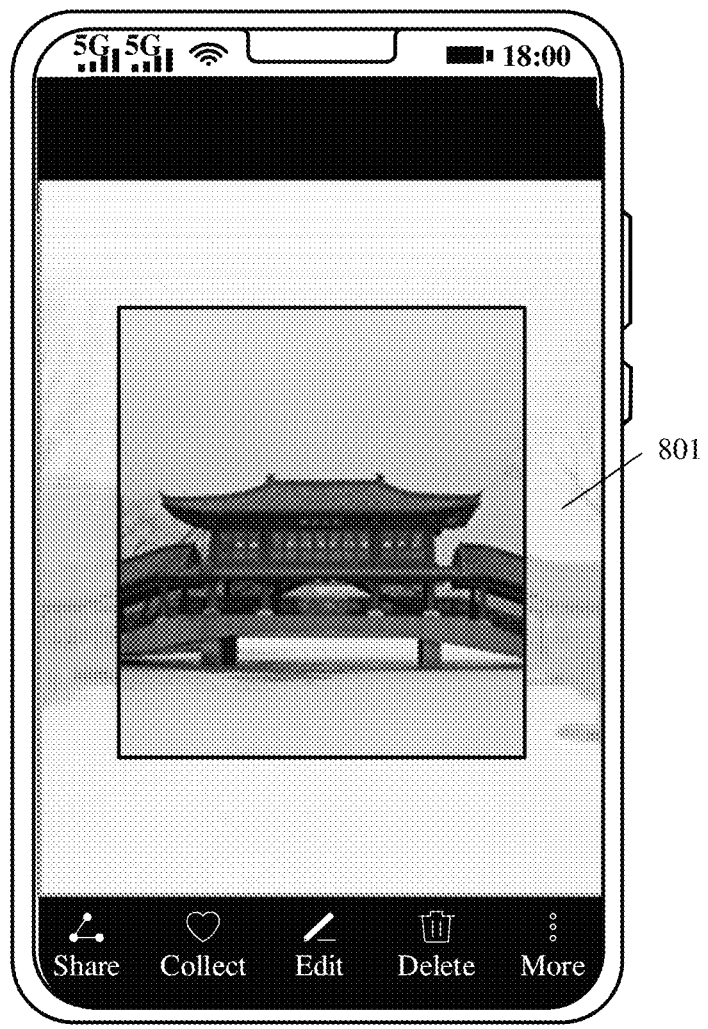
FIG. 8 is a schematic diagram of an example of another image viewing interface according to an embodiment of this application.

In some embodiments, in order to avoid abnormal phenomena such as image distortion and unevenness at the splicing of the main image and the first region image, the electronic device blurs the region in the first region image except for the first target region image. For example, the electronic device may add a coating layer over the region in the first region image except for the first target region image. For example, as shown in FIG. 8, the coating layer 801 is displayed over the region in the first region image except for the first target region image. For another example, the electronic device may blur the region in the first region image except for the first target region image by using a blurring algorithm. The blurring algorithm is not limited in this embodiment of this application. For example, the blurring algorithm may be Gaussian blur. For another example, the blurring algorithm may be box blur. For details of blurring the region in the first region image except for the first target region image by using the blurring algorithm by the electronic device, refer to a method in a conventional technology in which the electronic device blurs an image by using a blurring algorithm. The details are not described herein.

It may be understood that, since the electronic device blurs the region in the first region image except for the first target region image, a degree of abnormality at the splicing of the main image and the first region image can be reduced. In this way, the quality of the image displayed by the electronic device can be improved, thereby improving user experience.

Figure 9:
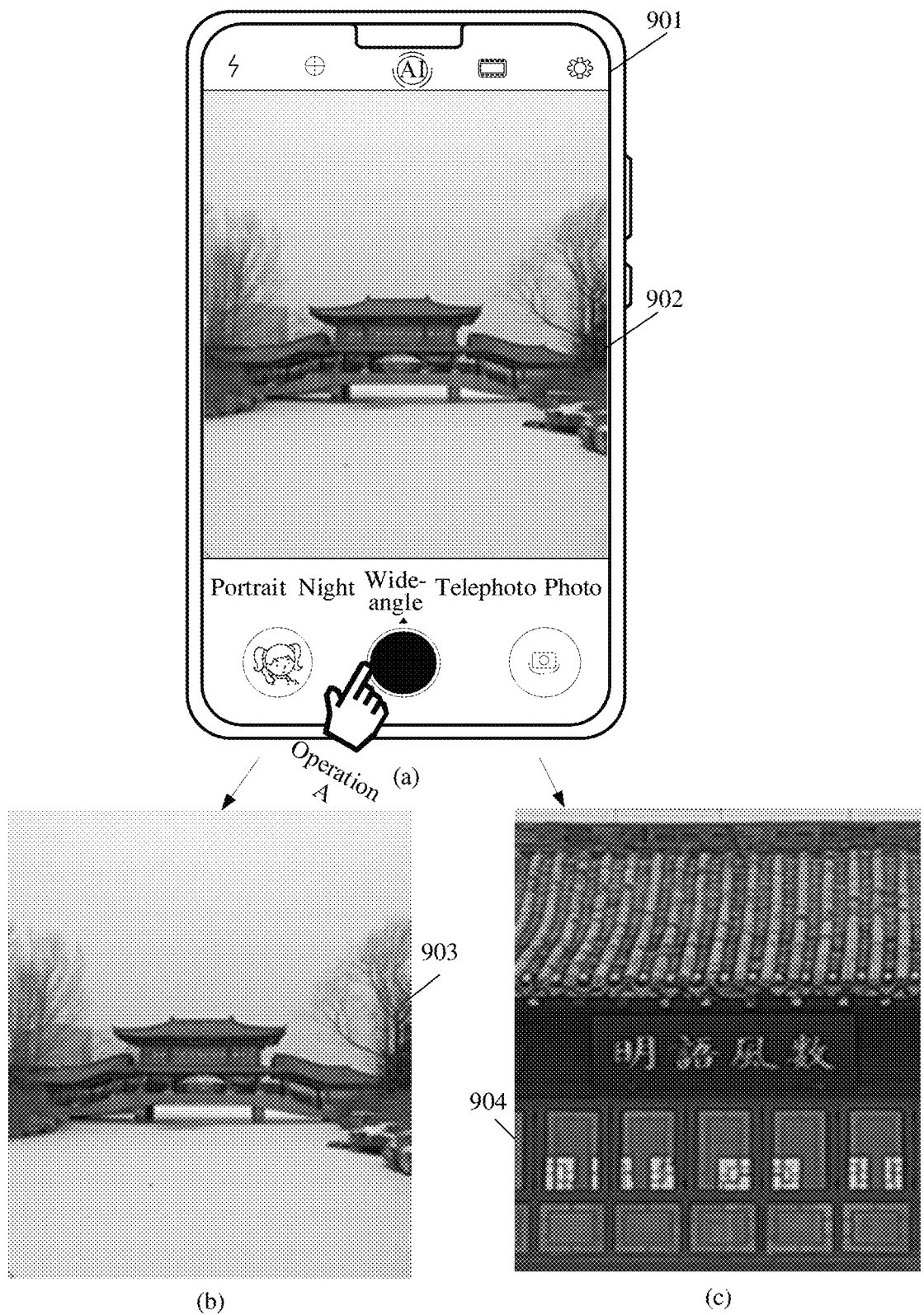
FIG. 9 is a schematic diagram of an example of another image preview interface according to an embodiment of this application.

In some other embodiments, the first camera and the second camera may be combined in the combination manner (2), that is, the first camera may be the wide-angle camera, and the second camera may be the telephoto camera. The electronic device may start an image capture application to display an image preview interface (that is, a first interface). The image preview interface is a viewfinder interface for image capture by the electronic device, and the image preview interface includes a first image acquired by the wide-angle camera. For example, as shown in (a) in FIG. 9, after the electronic device starts the image capture application, an image capture mode of the electronic device is the wide-angle image capture mode. The electronic device may display an image preview interface 901. The image preview interface 901 includes a preview image 902. The preview image 902 is an image acquired by the wide-angle camera. Optionally, the preview image 902 may be an image obtained after the electronic device performs image processing on a wide-angle image and a telephoto image (for details, refer to the following description, and details are not described in detail herein). Then the electronic device may receive an image capture operation of a user. In response to the image capture operation performed by the user on the image preview interface, the electronic device may acquire a first image (that is, the wide-angle image) by using the wide-angle camera and acquire a second image (that is, the telephoto image) by using the telephoto camera at the same moment. A viewfinder coverage of the wide-angle image is larger than a viewfinder coverage of the telephoto image. For example, a wide-angle image 903 shown in (b) in FIG. 9 is an image acquired by the wide-angle camera, and a telephoto image 904 shown in (c) in FIG. 9 is an image acquired by the telephoto camera. A viewfinder coverage of the wide-angle image 903 is larger than a viewfinder coverage of the telephoto image 904.

It should be noted that the above expression that the electronic device acquires the wide-angle image by using the wide-angle camera and acquires the telephoto image by using the telephoto camera at the same moment means that a moment (such as a first moment) at which the wide-angle camera acquires the wide-angle image and a moment (such as a third moment) at which the telephoto camera acquires the telephoto image are the same or a time difference between the first moment and the third moment is relatively small (for example, the time difference is less than 1 millisecond). When a time difference exists between the first moment and the third moment, whether the wide-angle camera acquires the wide-angle image first or the telephoto camera acquires the telephoto image first is not limited in this embodiment of this application.

In this embodiment of this application, in response to the image capture operation, the electronic device may save the wide-angle image and the telephoto image after acquiring the wide-angle image by using the wide-angle camera and acquiring the telephoto image by using the telephoto camera. The electronic device may save the wide-angle image in a visible form and saves the telephoto image in an invisible form. Alternatively, the electronic device may save the wide-angle image and the telephoto image in a visible form.

It should be noted that, for details of saving the wide-angle image and the telephoto image by the electronic device, refer to the description of saving the wide-angle image and the main image by the electronic device in the above embodiment. The details are not repeated herein.

In this embodiment of this application, the electronic device may receive a second operation, where the second operation is used for triggering the electronic device to display the wide-angle image. In response to the second operation, the electronic device displays the wide-angle image. Then the electronic device may receive a third operation, where the third operation is used for triggering the electronic device to display a first region image in a magnified wide-angle image. The first region image includes a first target region image, and the first target region image is a region in the wide-angle image having a same viewfinder coverage as the telephoto image. For example, as shown in (a) in FIG. 10, an image viewing interface 1001 displayed by the electronic device includes the wide-angle image 903. The electronic device may receive a third operation (such as an expanding operation) performed by the user on the image viewing interface 1001, to trigger the electronic device to display an image 1002 shown in (b) in FIG. 10. The image 1002 is a region in a magnified wide-angle image 903, and a viewfinder coverage of the image 1002 is the same as a viewfinder coverage of a region 1003 in the wide-angle image 903. That is to say, the image 1002 is a magnified region 1003. The image 1002 includes a first target region image 1004, and a viewfinder coverage of the first target region image 1004 is the same as the viewfinder coverage of the telephoto image (for example, the telephoto image 904 shown in (c) in FIG. 9).

It should be noted that, due to a low resolution of the first region image, in a case that the electronic device displays the first region image in the magnified wide-angle image, quality of the image displayed by the electronic device is poor. As a result, the user cannot view a high-quality image.

In this embodiment of this application, in order to improve the quality of the image displayed by the electronic device, the electronic device may splice the telephoto image to the first target region image for displaying in response to the third operation. That is to say, in response to the third operation, the electronic device may display a region in the first region image except for the first target region image and the telephoto image. For example, as shown in (c) in FIG. 10, the electronic device may splice the telephoto image 904 to the first target region image 1004 of the image 1002 for displaying.

In a possible implementation, the electronic device stores calibration information. The calibration information includes a relationship between a field of view of the wide-angle camera and a field of view of the telephoto camera and a correspondence between the viewfinder coverage of the telephoto image and the viewfinder coverage of the wide-angle image. In response to the third operation, the electronic device may render and display the telephoto image in the first target region image according to the calibration information.

It should be noted that, for details of rendering and displaying the telephoto image in the first target region image according to the calibration information by the electronic device, refer to the description of rendering and displaying the main image in the first target region image according to the calibration information by the electronic device in the above embodiment. The details are not repeated herein.

It may be understood that, after receiving the third operation, the electronic device may display the region in the first region image except for the first target region image and the telephoto image. In this way, the electronic device can display characteristics of both the wide-angle image and the telephoto image in one image, thereby ensuring that the user can view the wide-angle image and the telephoto image simultaneously. Moreover, since the image quality of the telephoto image is higher than image quality of the first target region image, and the viewfinder coverage of the telephoto image is the same as the viewfinder coverage of the first target region image, the quality of the image viewed by the user can be improved, thereby improving user experience.

It should be noted that, in order to further improve operability for the user, the electronic device may control a timing at which the electronic device splices the telephoto image to the first target region image for displaying. For details of controlling, by the electronic device, the timing at which the electronic device splices the telephoto image to the first target region image for displaying, refer to the description of controlling, by the electronic device by using the method (a) and the method (b), the timing at which the electronic device splices the main image to the first target region image in the above embodiment. The details are not repeated herein.

It should be noted that, when the electronic device controls, according to the above method (a), the timing of splicing the telephoto image to the first target region image for displaying, the first preset ratio is greater than 0.25 and less than 0.9025. For example, the first preset ratio may be 0.64. When the electronic device controls, according to the above method (b), the timing of splicing the telephoto image to the first target region image for displaying, the first preset magnification factor is greater than 2.45× and less than 3.15×. For example, the first preset magnification factor may be 3×.

It may be understood that, the electronic device may control the timing of splicing the telephoto image to the first target region image for displaying. In this way, the electronic device can display the telephoto image in a preset condition, thereby improving user experience.

Figure 10:
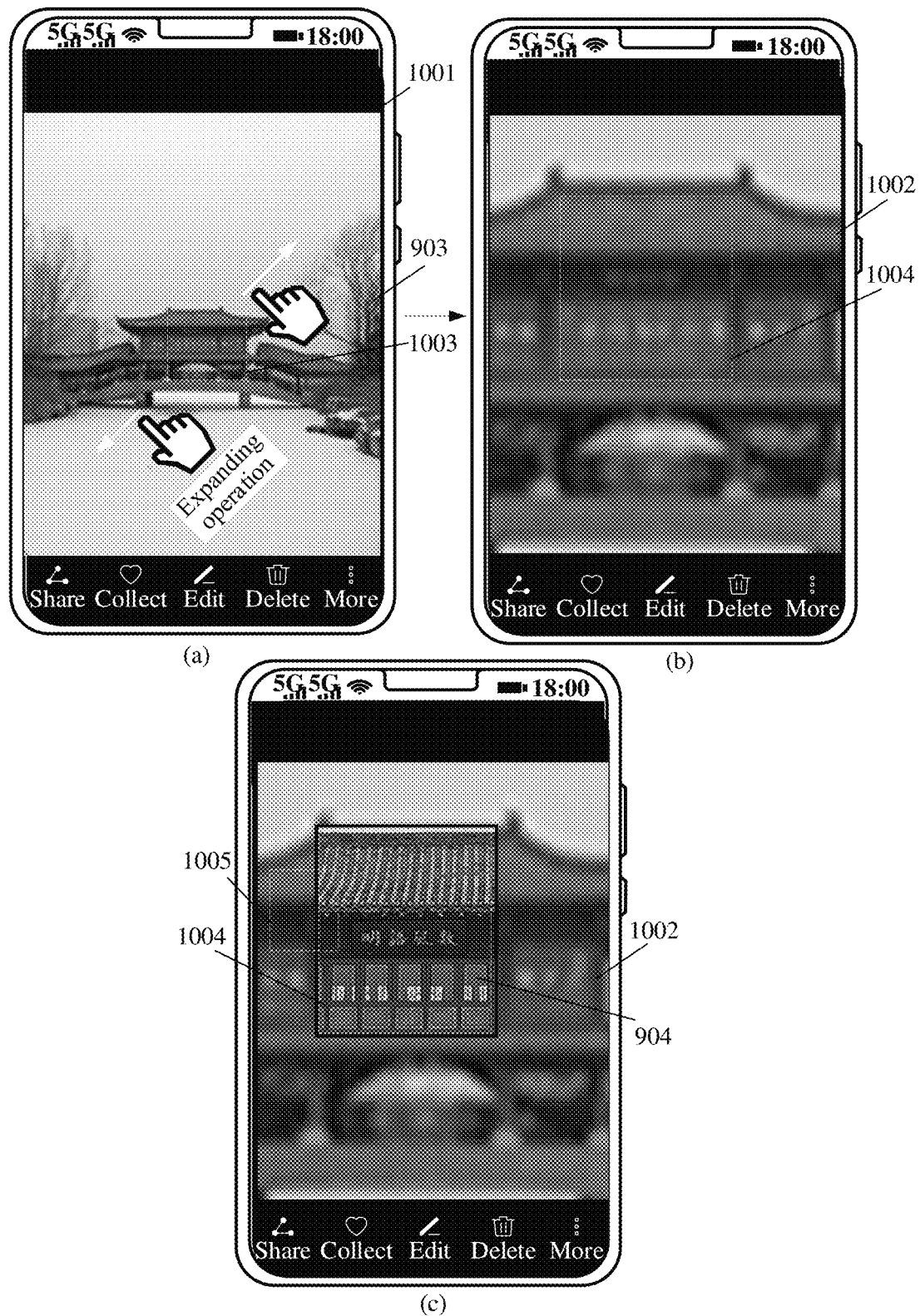
FIG. 10 is a schematic diagram of an example of another image viewing interface according to an embodiment of this application.

It should be noted that, when the electronic device splices the telephoto image to the first target region image for displaying, since the telephoto image is spliced to the first target region image, abnormal phenomena such as image distortion and unevenness may occur at a splicing of the telephoto image and the first region image (for example, a splicing region 1005 shown in (c) in FIG. 10). As a result, user experience may be relatively poor.

In some embodiments, in order to avoid abnormal phenomena such as image distortion and unevenness at the splicing of the telephoto image and the first region image, the electronic device blurs the region in the first region image except for the first target region image. For details of blurring the region in the first region image except for the first target region image by the electronic device, refer to the method in the above embodiment in which the electronic device blurs the region in the first region image except for the first target region image. The details are not described herein.

It may be understood that, since the electronic device blurs the region in the first region image except for the first target region image, a degree of abnormality at the splicing of the telephoto image and the first region image can be reduced. In this way, the quality of the image displayed by the electronic device can be improved, thereby improving user experience.

Figure 11:
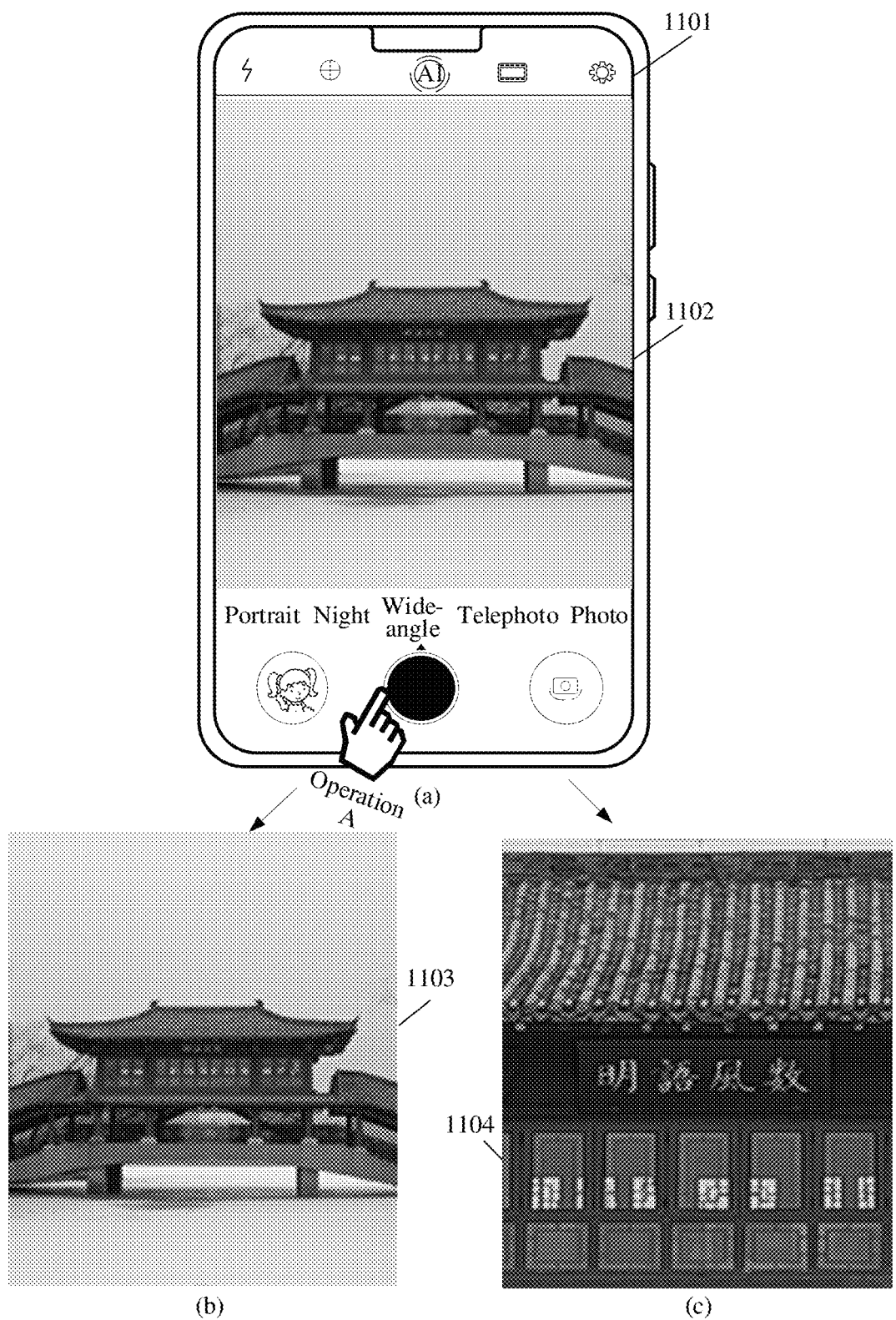
FIG. 11 is a schematic diagram of an example of another image preview interface according to an embodiment of this application.

In some embodiments, the first camera and the second camera may be combined in the combination manner (3), that is, the first camera may be the main camera, and the second camera may be the telephoto camera. The electronic device may start an image capture application to display an image preview interface (that is, a first interface). The image preview interface is a viewfinder interface for image capture by the electronic device, and the image preview interface includes a first image acquired by the main camera. For example, as shown in (a) in FIG. 11, after the electronic device starts the image capture application, an image capture mode of the electronic device is the normal image capture mode. The electronic device may display an image preview interface 1101. The image preview interface 1101 includes a preview image 1102. The preview image 1102 is an image acquired by the main camera. Optionally, the preview image 1102 may be an image obtained after the electronic device performs image processing on a main image and a telephoto image (for details, refer to the following description, and the details are not described in detail herein). Then the electronic device may receive an image capture operation of a user. In response to the image capture operation performed by the user on the image preview interface, the electronic device may acquire the first image (that is, the main image) by using the main camera and acquire the second image (that is, the telephoto image) by using the telephoto camera at the same moment. A viewfinder coverage of the main image is larger than a viewfinder coverage of the telephoto image. For example, a main image 1103 shown in (b) in FIG. 11 is an image acquired by the main camera, and a telephoto image 1104 shown in (c) in FIG. 11 is an image acquired by the telephoto camera. A viewfinder coverage of the main image 1103 is larger than a viewfinder coverage of the telephoto image 1104.

It should be noted that the above expression that the electronic device acquires the main image by using the main camera and acquires the telephoto image by using the telephoto camera at the same moment means that a moment (such as a second moment) at which the main camera acquires the main image and a moment (such as a third moment) at which the telephoto camera acquires the telephoto image are the same or a time difference between the second moment and the third moment is relatively small (for example, the time difference is less than 1 millisecond). When a time difference exists between the second moment and the third moment, whether the main camera acquires the main image first or the telephoto camera acquires the telephoto image first is not limited in this embodiment of this application.

In this embodiment of this application, in response to the image capture operation, the electronic device may save the main image and the telephoto image after acquiring the main image by using the main camera and acquiring the telephoto image by using the telephoto camera. The electronic device may save the main image in a visible form and saves the telephoto image in an invisible form. Alternatively, the electronic device may save the main image and the telephoto image in a visible form.

It should be noted that, for details of saving the main image and the telephoto image by the electronic device, refer to the description of saving the wide-angle image and the main image by the electronic device in the above embodiment. The details are not repeated herein.

In this embodiment of this application, the electronic device may receive a second operation, where the second operation is used for triggering the electronic device to display the main image. In response to the second operation, the electronic device displays the main image. Then the electronic device may receive a third operation, where the third operation is used for triggering the electronic device to display a first region image in a magnified main image. The first region image includes a first target region image, and the first target region image is a region in the main image having a same viewfinder coverage as the telephoto image. For example, as shown in (a) in FIG. 12, an image viewing interface 1201 displayed by the electronic device includes the main image 1103. The electronic device may receive a third operation (such as an expanding operation) performed by the user on the image viewing interface 1201, to trigger the electronic device to display an image 1202 shown in (b) in FIG. 12. The image 1202 is a region in a magnified main image 1103, and a viewfinder coverage of the image 1202 is the same as a viewfinder coverage of a region 1203 in the main image 1103. That is to say, the image 1202 is a magnified region 1203. The image 1202 includes a first target region image 1204, and a viewfinder coverage of the first target region image 1204 is the same as the viewfinder coverage of the telephoto image (for example, the telephoto image 1104 shown in (c) in FIG. 11). Optionally, in response to the second operation, the electronic device may splice the main image to a second target region image in a wide-angle image, and splices the telephoto image to a region in the main image that has a same viewfinder coverage as the telephoto image.

It should be noted that, due to a low resolution of the first region image, in a case that the electronic device displays the first region image in the magnified main image, quality of the image displayed by the electronic device is poor. As a result, the user cannot view a high-quality image.

In this embodiment of this application, in order to improve the quality of the image displayed by the electronic device, the electronic device may splice the telephoto image to the first target region image for displaying in response to the third operation. That is to say, in response to the third operation, the electronic device may display a region in the first region image except for the first target region image and the telephoto image. For example, as shown in (c) in FIG. 12, the electronic device may splice the telephoto image 1104 to the first target region image 1204 of the image 1202 for displaying.

It may be understood that, after receiving the third operation, the electronic device may display the region in the first region image except for the first target region image and the telephoto image. In this way, the electronic device can display characteristics of both the main image and the telephoto image in one image, thereby ensuring that the user can view the main image and the telephoto image simultaneously. Moreover, since the image quality of the telephoto image is higher than image quality of the first target region image, and the viewfinder coverage of the telephoto image is the same as the viewfinder coverage of the first target region image, the quality of the image viewed by the user can be improved, thereby improving user experience.

It should be noted that, in order to further improve operability for the user, the electronic device may control a timing at which the electronic device splices the telephoto image to the first target region image for displaying. For details of controlling, by the electronic device, the timing at which the electronic device splices the telephoto image to the first target region image for displaying, refer to the description of controlling, by the electronic device by using the method (a) and the method (b), the timing at which the electronic device splices the main image to the first target region image in the above embodiment. The details are not repeated herein.

It should be noted that, when the electronic device controls, according to the above method (a), the timing of splicing the telephoto image to the first target region image for displaying, the first preset ratio is greater than 0.5 and less than 0.95. For example, the first preset ratio may be 0.8. When the electronic device controls, according to the above method (b), the timing of splicing the telephoto image to the first target region image for displaying, the first preset magnification factor is greater than 2.45× and less than 3.15×. For example, the first preset magnification factor may be 3×.

It may be understood that, the electronic device may control the timing of splicing the telephoto image to the first target region image for displaying. In this way, the electronic device can display the telephoto image in a preset condition, thereby improving user experience.

Figure 12:
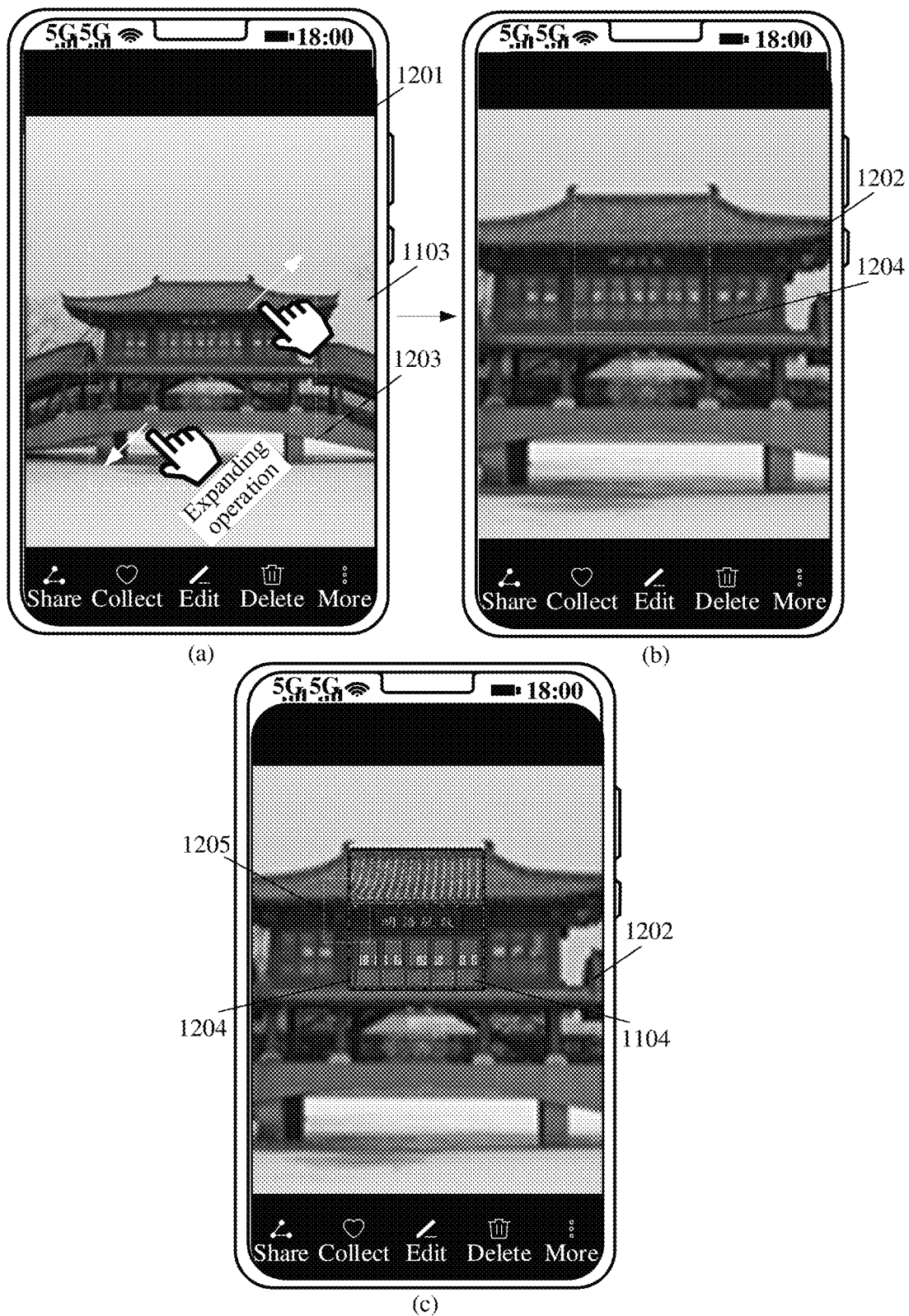
FIG. 12 is a schematic diagram of an example of another image viewing interface according to an embodiment of this application.

In some embodiments, in order to avoid abnormal phenomena such as image distortion and unevenness at the splicing of the telephoto image and the first region image (such as a splicing region 1205 shown in (c) in FIG. 12), the electronic device blurs the region in the first region image except for the first target region image. For details of blurring the region in the first region image except for the first target region image by the electronic device, refer to the method in the above embodiment in which the electronic device blurs the region in the first region image except for the first target region image. The details are not described herein.

It may be understood that, since the electronic device blurs the region in the first region image except for the first target region image, a degree of abnormality at the splicing of the telephoto image and the first region image can be reduced. In this way, the quality of the image displayed by the electronic device can be improved, thereby improving user experience.

In some embodiments, in a case that the first camera and the second camera are combined in the combination method (1), that is, the first camera may be the wide-angle camera and the second camera may be the main camera, the electronic device may further include the telephoto camera (that is, a third camera). A field of view of the wide-angle camera is larger than a field of view of the main camera, and the field of view of the main camera is larger than a field of view of the telephoto camera. The electronic device may start an image capture application to display an image preview interface (that is, a first interface). The image preview interface is a viewfinder interface for image capture by the electronic device, and the image preview interface includes a first image acquired by the wide-angle camera. For example, as shown in (a) in FIG. 13, after the electronic device starts the image capture application, an image capture mode of the electronic device is the wide-angle image capture mode. The electronic device may display an image preview interface 1301. The image preview interface 1301 includes a preview image 1302. The preview image 1302 is an image acquired by the wide-angle camera. Optionally, the preview image 1302 may be an image obtained after the electronic device performs image processing on a wide-angle image, a main image, and a telephoto image (for details, refer to the following description, and the details are not described in detail herein).

Figure 13:
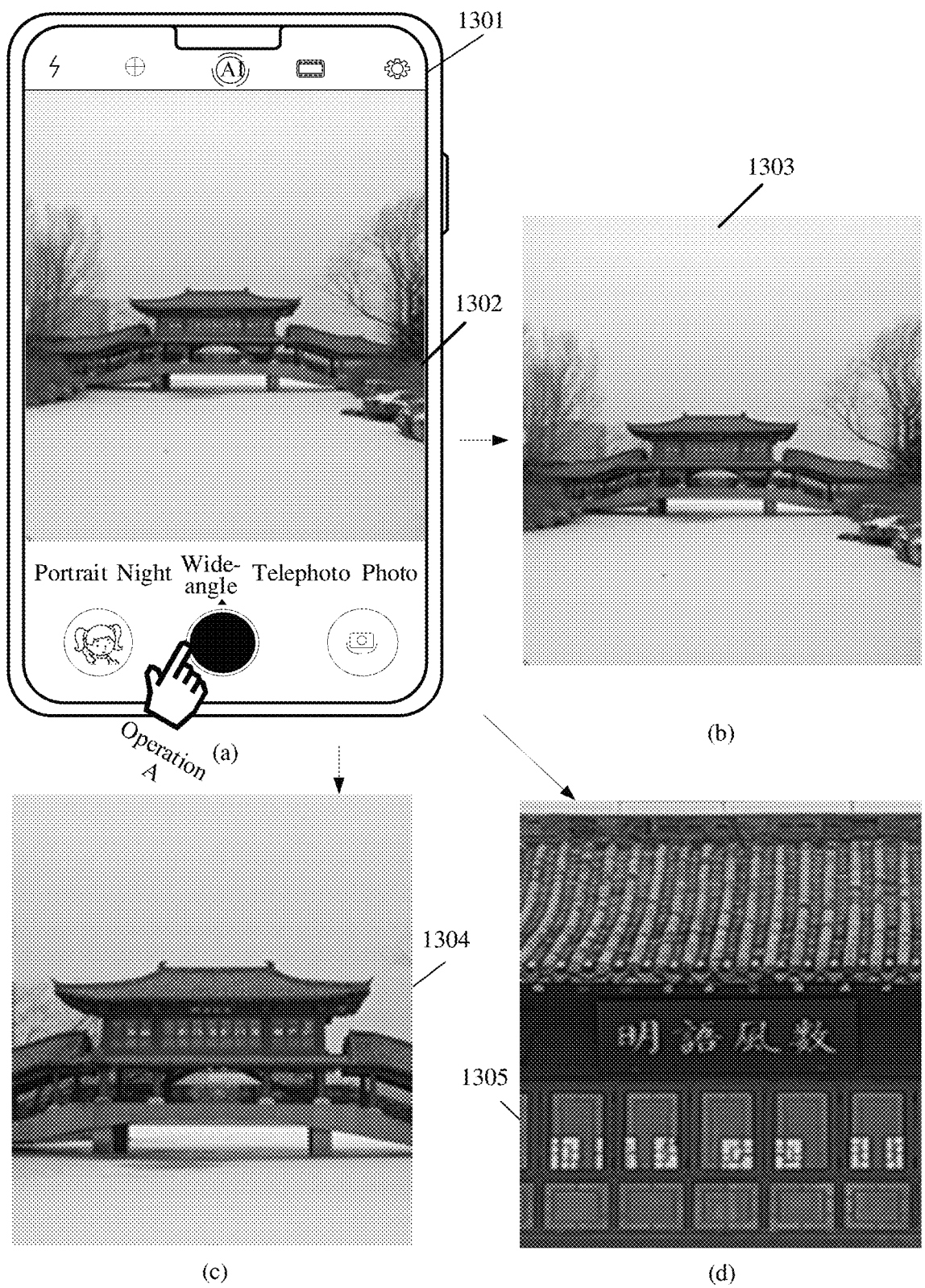
FIG. 13 is a schematic diagram of an example of another image preview interface according to an embodiment of this application.

The electronic device may receive an image capture operation of a user. In response to the image capture operation performed by the user on the image preview interface, the electronic device may acquire a first image (that is, the wide-angle image) by using the wide-angle camera, acquire a second image (that is, the main image) by using the main camera, and acquire a third image (that is, the telephoto image) by using the telephoto camera at the same moment. A viewfinder coverage in which the telephoto camera acquires the telephoto image is a fourth viewfinder coverage (that is, a viewfinder coverage of the telephoto image). A viewfinder coverage of the wide-angle image is larger than the viewfinder coverage of the telephoto image, and a viewfinder coverage of the main image is larger than the viewfinder coverage of the telephoto image. For example, a wide-angle image 1303 shown in (b) in FIG. 13 is an image acquired by the wide-angle camera, a main image 1304 shown in (c) in FIG. 13 is an image acquired by the main camera, and a telephoto image 1305 shown in (d) in FIG. 13 is an image acquired by the telephoto camera. A viewfinder coverage of the wide-angle image 1303 is larger than a viewfinder coverage of the main image 1304, and the viewfinder coverage of the main image 1304 is larger than a viewfinder coverage of the telephoto image 1305.

It should be noted that the above expression that the electronic device acquires the wide-angle image by using the wide-angle camera, acquires the main image by using the main camera, and acquires the telephoto image by using the telephoto camera at the same moment means that a moment (such as a first moment) at which the wide-angle camera acquires the wide-angle image, a moment (such as a second moment) at which the main camera acquires the main image, and a moment (such as a third moment) at which the telephoto camera acquires the telephoto image are the same or a time difference between the first moment and the second moment, a time difference between the first moment and the third moment, and a time difference between the second moment and the third moment are all relatively small (for example, the time differences are all less than 1 millisecond). When a time difference exists among the first moment, the second moment, and the third moment, whether the wide-angle camera acquires the wide-angle image first, the main camera acquires the main image first, or the telephoto camera acquires the telephoto image first is not limited in this embodiment of this application.

In this embodiment of this application, in response to the image capture operation, the electronic device may save the wide-angle image, the main image, and the telephoto image after acquiring the wide-angle image by using the wide-angle camera, acquiring the main image by using the main camera, and acquiring the telephoto image by using the telephoto camera. The electronic device may save the wide-angle image in a visible form and saves the main image and the telephoto image in an invisible form. Alternatively, the electronic device may save the wide-angle image, the main image, and the telephoto image in a visible form.

It should be noted that, for details of saving the wide-angle image, the main image, and the telephoto image by the electronic device, refer to the description of saving the wide-angle image and the main image by the electronic device in the above embodiment. The details are not repeated herein.

In this embodiment of this application, the electronic device may receive a second operation, where the second operation is used for triggering the electronic device to display the wide-angle image. In response to the second operation, the electronic device displays the wide-angle image. Then the electronic device may receive a third operation, where the third operation is used for triggering the electronic device to display a first region image in a magnified wide-angle image. The electronic device may splice the main image to the first target region image for displaying in response to the third operation.

It should be noted that, for details of splicing, by the electronic device, the main image to the first target region image for displaying in response to the third operation, refer to the above embodiment. The details are not repeated herein.

In some embodiments, after the electronic device splices the main image to the first target region image for displaying, the electronic device may receive a fourth operation. The fourth operation is used for triggering the electronic device to display a second region image in a magnified main image. The second region image includes a third target region image. A viewfinder coverage of the third target region image relative to the second camera is a fifth viewfinder coverage. The second viewfinder coverage includes the fifth viewfinder coverage, and the fifth viewfinder coverage coincides with the fourth viewfinder coverage. For example, the fifth viewfinder coverage is a viewfinder coverage of a third target region image 1405 shown in (b) in FIG. 14.

Figure 14:
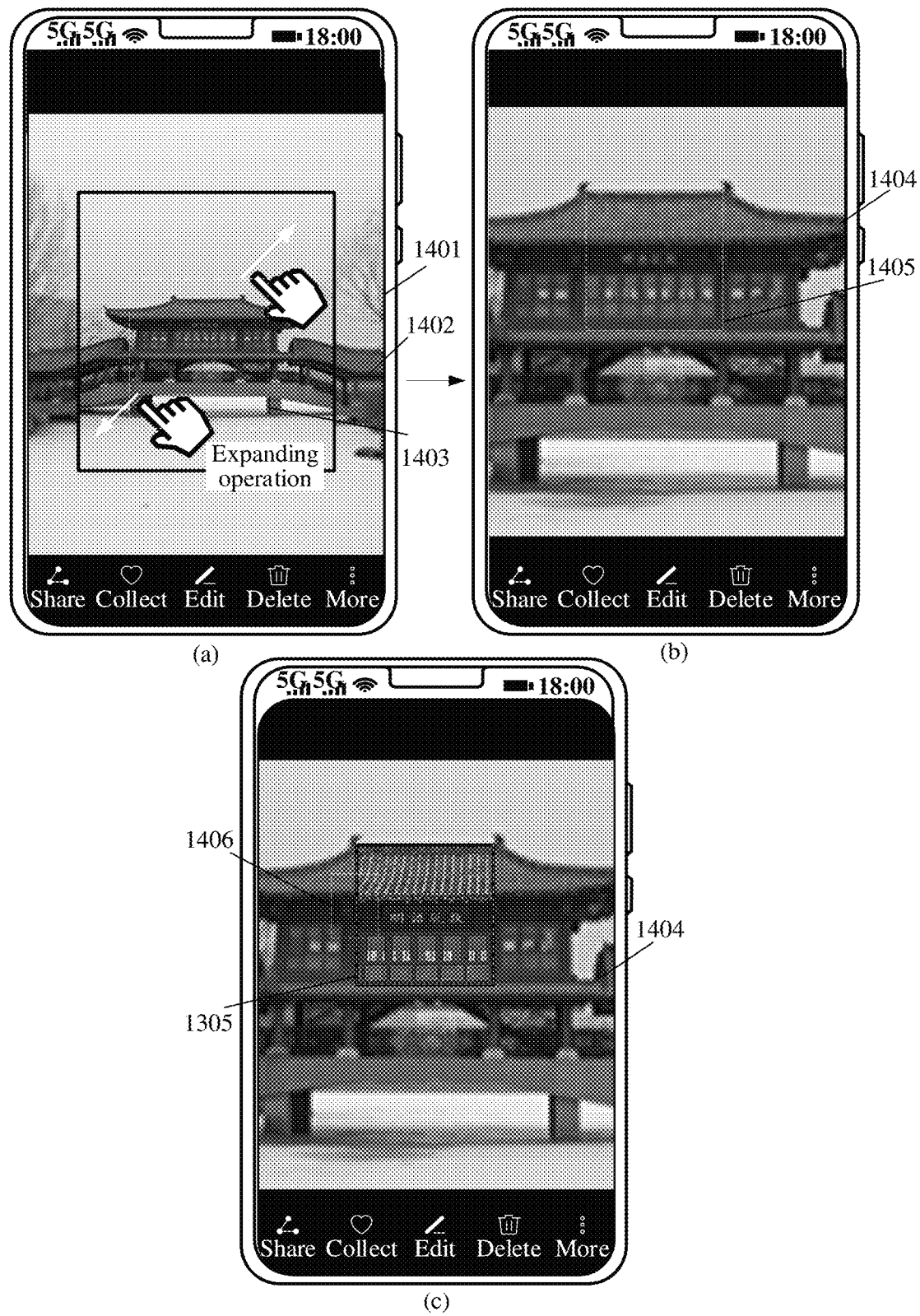
FIG. 14 is a schematic diagram of an example of another image viewing interface according to an embodiment of this application.

For example, as shown in (c) in FIG. 6, after the electronic device splices the main image 309 to the first target region image 604 of the image 603 for displaying, as shown in (a) in FIG. 14, the electronic device may display an image viewing interface 1401. The image viewing interface 1401 includes an image 1402 (that is, an image obtained after the main image 309 shown in (c) in FIG. 6 is spliced to the first target region image 604). The electronic device may receive a fourth operation (such as an expanding operation) performed by the user on the image viewing interface 1401, to trigger the electronic device to display an image 1404 shown in (b) in FIG. 14. The image 1404 is a region in a magnified image 1402, and a viewfinder coverage of the image 1404 is the same as a viewfinder coverage of a region image 1403 in the image 1402. That is to say, the image 1404 is a magnified region image 1403. The image 1404 includes a third target region image 1405, and a viewfinder coverage of the third target region image 1405 is the same as the viewfinder coverage of the telephoto image (for example, the telephoto image 1305 shown in (d) in FIG. 13).

It should be noted that, due to a low resolution of the second region image, in a case that the electronic device displays the second region image in the magnified image, quality of the image displayed by the electronic device is poor. As a result, the user cannot view a high-quality image.

In this embodiment of this application, in order to improve the quality of the image displayed by the electronic device, the electronic device may splice the telephoto image to the third target region image for displaying in response to the fourth operation. That is to say, in response to the fourth operation, the electronic device may display a region in the second region image except for the third target region image and the telephoto image. For example, as shown in (c) in FIG. 14, the electronic device may splice the telephoto image 1305 to the third target region image 1405 of the image 1404 for displaying.

In a possible implementation, the electronic device stores calibration information. The calibration information includes a relationship between a field of view of the main camera and a field of view of the telephoto camera and a correspondence between the viewfinder coverage of the main image and the viewfinder coverage of the telephoto image. In response to the fourth operation, the electronic device may render and display the telephoto image in the third target region image according to the calibration information.

It should be noted that, for description of rendering and displaying the telephoto image in the third target region image according to the calibration information by the electronic device, refer to the above embodiment. The details are not repeated herein.

It should be noted that, in order to further improve operability for the user, the electronic device may control a timing at which the electronic device splices the telephoto image to the third target region image for displaying. Specifically, the electronic device may control, by using a resolution of the image and a resolution of a display, a timing at which the electronic device splices the telephoto image to the third target region image for displaying. Alternatively, the electronic device may control, according to a magnification factor of the image, the timing at which the electronic device splices the telephoto image to the third target region image for displaying.

In some embodiments, the electronic device may obtain a resolution of the second region image and the resolution of the display. Then the electronic device may calculate a second ratio according to the resolution of the second region image and the resolution of the display, where the second ratio is a ratio of the resolution of the second region image to the resolution of the display. For description of calculating the second ratio by the electronic device, refer to the above formula I, and the details are not repeated herein.

The electronic device may determine, according to the second ratio and a first preset ratio, whether to splice the telephoto image to the third target region image for displaying. The first preset ratio is greater than 0.5 and less than 0.95. This embodiment of this application is described below by using an example that the first preset ratio is 0.8.

In a possible design, if the second ratio is greater than the first preset ratio, the electronic device may splice the telephoto image to the third target region image for displaying. If the second ratio is less than the first preset ratio, the electronic device displays only the second region image without splicing the telephoto image to the third target region image for displaying. For example, if the second ratio is 0.85, the electronic device may splice the telephoto image to the third target region image for displaying (for example, (c) in FIG. 14). If the second ratio is 0.75, the electronic device displays only the second region image (for example, (b) in FIG. 14).

It may be understood that, by comparing the second ratio with the first preset ratio, the electronic device may control splicing of the telephoto image to the third target region image for displaying. In this way, the electronic device can display the telephoto image in a preset condition, thereby improving user experience.

In some other embodiments, the electronic device may obtain a second factor. The second factor is a magnification factor after the fourth operation triggers the electronic device to magnify the main image (that is, the magnification factor of the magnified main image, for example, a magnification factor of the image 1404). For example, the electronic device may obtain the second factor in the following manner. Specifically, the electronic device may obtain the magnification factor of the main image (that is, a magnification factor of the unmagnified main image, such as the main image 1304), the resolution of the main image (such as a resolution of the main image 1304), and the resolution of the second region image (such as a resolution of image 1404). Then the electronic device may calculate the second factor according to the magnification factor of the main image, the resolution of the main image, and the resolution of the second region image. For the method in which the electronic device calculates the second factor, refer to the above formula II, and the details are not repeated herein.

The electronic device may determine, according to the second factor and a second preset magnification factor, whether to splice the telephoto image to the third target region image for displaying. The second preset magnification factor is greater than 2.45× and less than 3.15×. This embodiment of this application is described below by using an example that the second preset factor is 3×.

In a possible design, if the second factor is greater than the second preset magnification factor, the electronic device may splice the telephoto image to the third target region image for displaying. If the second factor is less than the second preset magnification factor, the electronic device displays only the second region image without splicing the telephoto image to the third target region image for displaying. For example, if the second preset magnification factor is 3.5×, the electronic device may splice the telephoto image to the third target region image for displaying (for example, (c) in FIG. 14). If the second factor is 2×, the electronic device displays only the second region image (for example, (b) in FIG. 14).

It may be understood that, the electronic device may control the timing of splicing the telephoto image to the third target region image for displaying. In this way, the electronic device can display the telephoto image in a preset condition, thereby improving user experience.

In other embodiments, after the electronic device obtains the fourth image, the electronic device may receive a fifth operation, where the fifth operation is used for triggering the electronic device to display a third region image in a magnified fourth image, and the third region image includes the third target region image. In response to the fifth operation, the electronic device may perform image fusion on the third region image and the third image (that is, the telephoto image) to obtain the fifth image. Then the electronic device may display the fifth image.

It should be noted that the electronic device may control a timing of performing image fusion on the third region image and the telephoto image. For details, refer to the description of controlling, by the electronic device, the timing of splicing the telephoto image to the first target region image in the above embodiment. The details are not repeated herein.

It may be understood that, by image fusion, the image quality can be improved. Moreover, a larger viewfinder coverage of the third region image leads to higher image quality of the telephoto image. During the image fusion of the telephoto image and the third region image, the electronic device may combine characteristics of the telephoto image and the third region image to obtain a fifth image with a relatively large viewfinder coverage and a relatively large local image definition. In this way, the quality of the image viewed by the user can be improved, thereby improving user experience.

It should be noted that, when the electronic device splices the telephoto image to the third target region image for displaying, since the telephoto image is spliced to the third target region image, abnormal phenomena such as image distortion and unevenness may occur at a splicing of the telephoto image and the second region image (for example, a splicing region 1406 shown in (c) in FIG. 14). As a result, user experience may be relatively poor.

In some embodiments, in order to avoid abnormal phenomena such as image distortion and unevenness at the splicing of the telephoto image and the second region image, the electronic device blurs the region in the second region image except for the third target region image. For details of blurring the region in the second region image except for the third target region image by the electronic device, refer to the method in the above embodiment in which the electronic device blurs the region in the first region image except for the first target region image. The details are not described herein.

It may be understood that, since the electronic device blurs the region in the second region image except for the third target region image, a degree of abnormality at the splicing of the telephoto image and the second region image can be reduced. In this way, the quality of the image displayed by the electronic device can be improved, thereby improving user experience.

It should be noted, many types of images are stored in the electronic device. The electronic device may display conventional types of images in conventional display manners. For example, the electronic device may display a telephoto image, a main image, and the like on the display. The electronic device may alternatively display the above spliced images (such as the image shown in (c) in FIG. 6 and the image shown in (c) in FIG. 10) in a preset mode.

In some embodiments, in order to help the electronic device determine an image display manner, when saving the first image and the second image (or the third image), the electronic device may add a first identifier to image information of the first image and the second image. The first identifier is used for instructing the electronic device to display the spliced image in the preset mode. In response to the third operation (or the fourth operation), the electronic device may determine whether to display the image in the preset mode according to the image information of the image. For example, after receiving the third operation of the user, the electronic device may detect whether the image information of the image has the first identifier. If the image information has the first identifier, the electronic device may display the spliced image according to the preset mode. If the image information does not have the first identifier, the electronic device may display the image in the conventional display manner.

It may be understood that, since the electronic device adds the first identifier to the image, the electronic device can display the spliced image according to the preset mode. That is to say, the electronic device can display characteristics of all of the wide-angle image, the main image, and the telephoto image in one image, thereby ensuring that the user can view the wide-angle image, the main image, and the telephoto image simultaneously. In this way, the quality of the image viewed by the user can be improved, thereby improving user experience.

It should be noted that, after the electronic device captures the above first image, second image, and third image, the electronic device may share the first image, the second image, and the third image with other electronic devices. Specifically, the electronic device may share the first image, the second image, and the third image with the other electronic devices by transmitting data packets. Alternatively, the electronic device may share the first image, the second image, and the third image with the other electronic devices by transmitting the first image, the second image, and the third image respectively.

In some embodiments, the electronic device may share the first image, the second image, and the third image with the other electronic devices by transmitting one data packet. Specifically, the electronic device may send the data packet to the other electronic devices (which may be referred to as receiving side devices). The data packet includes the first image, the second image, and the third image. Then the receiving side devices may receive the data packet and save the first image, the second image, and the third image. For example, the receiving side devices may save the first image in a visible form, and save the second image and the third image in an invisible form (for example, shown in FIG. 4A). If the receiving side devices can identify the first identifier, the receiving side devices can display the spliced image. Optionally, if the receiving side devices can identify the first identifier, the receiving side devices can save the above first image, second image, and third image in a visible form (for example, shown in FIG. 4B). If the receiving side devices cannot identify the first identifier, the receiving side devices display only the first image.

In some embodiments, the electronic device may share the first image, the second image, and the third image with the other electronic devices by transmitting the first image, the second image, and the third image respectively. Specifically, the electronic device may send the first image, the second image, and the third image to the receiving side devices. After receiving the first image, the second image, and the third image, the receiving side devices may save the first image, the second image, and the third image in a visible form. If the receiving side devices can identify the first identifier, the receiving side devices can display the spliced image. Optionally, if the receiving side devices can identify the first identifier, the receiving side devices may save the first image in a visible form, and save the second image and the third image in an invisible form. If the receiving side devices cannot identify the first identifier, the receiving side devices display only the first image.

It may be understood that, in a case that the receiving side devices can identify the first identifier, the receiving side devices may display the spliced image. That is to say, the electronic device can display the characteristics of all of the wide-angle image, the main image, and the telephoto image in one image, thereby ensuring that the user can view the wide-angle image, the main image, and the telephoto image simultaneously. In this way, the quality of the image viewed by the user can be improved, thereby improving user experience.

The solution provided in the embodiments of this application is mainly described above from the perspective of an electronic device. It may be understood that to implement the foregoing functions, the electronic device includes corresponding hardware structures and/or software modules for performing the functions. Those skilled in the art can easily realize that the steps of the image display method in all of the examples described in combination with the embodiments disclosed in this application can be implemented in a form of hardware or a combination of hardware and computer software. Whether a function is implemented by hardware or electronic device software driving hardware depends on particular applications and design constraints of the technical solutions. Those skilled in the art may use different methods to implement the described functions for each particular application, but such implementation is not to be considered beyond the scope of this application.

In the embodiments of this application, functional module division or functional unit division may be performed on the image display apparatus according to the above method examples. For example, functional modules or functional units may be divided corresponding to the functions, or two or more functions may be integrated in one processing module. The integrated module may be implemented in a form of hardware, or may be implemented in a form of a software function module or functional unit. The module or unit division in the embodiments of this application is an example and is merely logical function division, and may be other division during actual implementation.

Some other embodiments of this application provide an electronic device (for example, the mobile phone 200 shown in FIG. 2A). A plurality of preset applications are installed in the electronic device. The electronic device may include a memory and one or more processors. The memory is coupled to the processors. The electronic device may further include a camera. Alternatively, the electronic device may be connected to an external camera. The memory is configured to store computer program code, and the computer program code includes computer instructions. When the processor executes the computer instructions, the electronic device can perform various functions or steps performed by the mobile phone in the above method embodiments. For a structure of the electronic device, refer to the structure of the mobile phone 200 shown in FIG. 2A.

Figure 15:
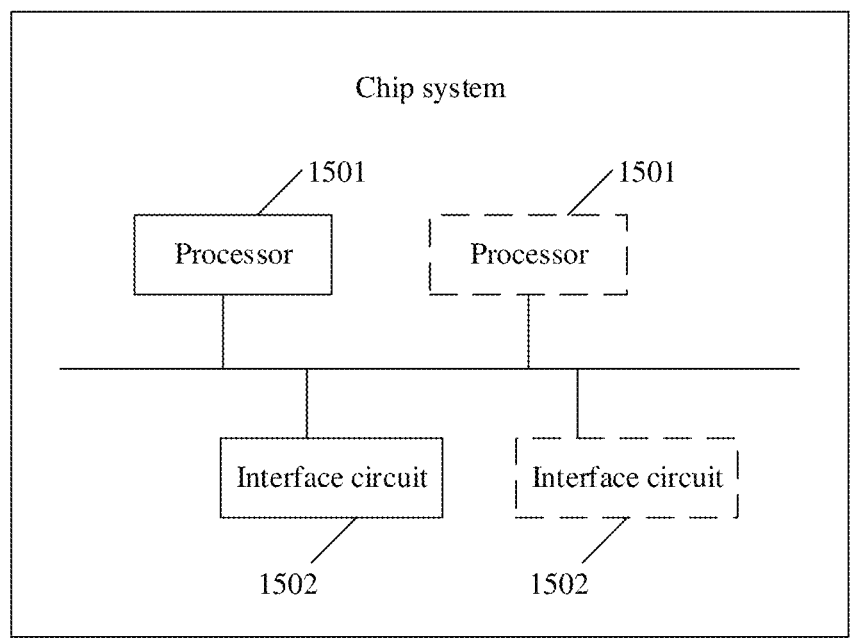
FIG. 15 is a schematic structural composition diagram of a chip system according to an embodiment of this application.

An embodiment of this application further provides a chip system. As shown in FIG. 15, the chip system includes at least one processor 1501 and at least one interface circuit 1502. The processor 1501 and the interface circuit 1502 may be interconnected by lines. For example, the interface circuit 1502 may be configured to receive a signal from another apparatus (such as a memory of the electronic device). In another example, the interface circuit 1502 may be configured to send a signal to another apparatus (for example, the processor 1501). For example, the interface circuit 1502 may read instructions stored in the memory and send the instructions to the processor 1501. The instructions, when executed by the processor 1501, can cause the electronic device (the mobile phone 200 shown in FIG. 2A) perform all of the steps in the above embodiments. Certainly, the chip system may further include other discrete devices. This is not specifically limited in this embodiment of this application.

An embodiment of this application further provides a computer-readable storage medium. The computer-readable storage medium includes computer instructions. The computer instructions, when run on the above electronic device (the mobile phone 200 shown in FIG. 2A), cause the electronic device to perform all of the functions or steps performed by the mobile phone in the above method embodiments.

An embodiment of this application further provides a computer program product. The computer program product, when run on a computer, causes the computer to perform all of the functions or steps performed by the mobile phone in the above method embodiments.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an internal structure of an apparatus is divided into different functional modules to complete all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing contents are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image display method, applicable to an electronic device, wherein the electronic device comprises a display, a first camera, and a second camera, a field of view of the first camera is larger than a field of view of the second camera, and the method comprises:
　　receiving, by the electronic device, a first operation performed by a user on a first interface, wherein the first interface is a viewfinder interface for image capture by the electronic device, and the first interface comprises a preview image acquired by the first camera;
　　saving, by the electronic device in response to the first operation, a first image acquired by the first camera and a second image acquired by the second camera, wherein a viewfinder coverage in which the first camera acquires the first image is a first viewfinder coverage, a viewfinder coverage in which the second camera acquires the second image is a second viewfinder coverage, and the first viewfinder coverage is larger than the second viewfinder coverage;
　　receiving, by the electronic device, a second operation, wherein the second operation is used for triggering the electronic device to display the first image;
　　displaying, by the electronic device, the first image in response to the second operation;
　　receiving, by the electronic device, a third operation, wherein the third operation is used for triggering the electronic device to display a first region image in a magnified first image, the first region image comprises a first target region image, a viewfinder coverage of the first target region image relative to the first camera is a third viewfinder coverage, the first viewfinder coverage comprises the third viewfinder coverage, and the third viewfinder coverage coincides with the second viewfinder coverage; and
　　splicing, by the electronic device, the second image to the first target region image for displaying in response to the third operation,
　　wherein the electronic device further comprises a third camera, the field of view of the second camera is larger than a field of view of the third camera, and the method further comprises:
　　saving, by the electronic device in response to the image capture operation, a third image acquired by the third camera, wherein a viewfinder coverage in which the third camera acquires the third image is a fourth viewfinder coverage, and the second viewfinder coverage is larger than the fourth viewfinder coverage, and
　　wherein the method further comprises;
　　receiving, by the electronic device, a fourth operation, wherein the fourth operation is used for triggering the electronic device to display a second region image in a magnified second image, the second region image comprises a third target region image, a viewfinder coverage of the third target region image relative to the second camera is a fifth viewfinder coverage, the second viewfinder coverage comprises the fifth viewfinder coverage, and the fifth viewfinder coverage coincides with the fourth viewfinder coverage;
　　obtaining, by the electronic device, a resolution of the second region image and the resolution of the display;
　　calculating, by the electronic device, a second ratio according to the resolution of the second region image and the resolution of the display, wherein the second ratio is a ratio of the resolution of the second region image to the resolution of the display; and
　　splicing, by the electronic device, the third image to the third target region image for displaying in a case that the second ratio is greater than a first preset ratio.

2. The method according to claim 1, wherein, after the receiving, by the electronic device, a second operation, the method further comprises:
splicing, by the electronic device, the second image to a second target region image in the first image for displaying in response to the second operation, wherein a viewfinder coverage of the second target region image relative to the first camera coincides with the second viewfinder coverage.

3. The method according to claim 1, wherein, after the receiving, by the electronic device, a third operation, the method further comprises:
obtaining, by the electronic device, a resolution of the first region image and a resolution of the display; and
calculating, by the electronic device, a first ratio according to the resolution of the first region image and the resolution of the display, wherein the first ratio is a ratio of the resolution of the first region image to the resolution of the display; and
the splicing, by the electronic device, the second image to the first target region image for displaying comprises:
splicing, by the electronic device, the second image to the first target region image for displaying in a case that the first ratio is greater than a first preset ratio.

4. The method according to claim 1, wherein, after the receiving, by the electronic device, a third operation, the method further comprises:
obtaining, by the electronic device, a first factor, wherein the first factor is a magnification factor after the third operation triggers the electronic device to magnify the first image; and
the splicing, by the electronic device, the second image to the first target region image for displaying comprises:
splicing, by the electronic device, the second image to the first target region image for displaying in a case that the first factor is greater than a first preset magnification factor.

5. The method according to claim 4, wherein the obtaining, by the electronic device, a first factor comprises:
obtaining, by the electronic device, a magnification factor of the first image, a resolution of the first image, and a resolution of the first region image; and
calculating, by the electronic device, the first factor according to the magnification factor of the first image, the resolution of the first image, and the resolution of the first region image.

6. The method according to claim 5, wherein the first factor satisfies the following formula:

$$M = \sqrt{\frac{B}{A}} \times Z$$

wherein M represents the first factor, B represents the resolution of the first image, A represents the resolution of the first region image, and Z represents the magnification factor of the first image.

7. The method according to claim 1, wherein the method further comprises:
blurring, by the electronic device, a region in the first region image except for the first target region image in response to the third operation.

8. An image display method, applicable to an electronic device, wherein the electronic device comprises a display, a first camera, and a second camera, a field of view of the first camera is larger than a field of view of the second camera, and the method comprises:
receiving, by the electronic device, a first operation performed by a user on a first interface, wherein the first interface is a viewfinder interface for image capture by the electronic device, and the first interface comprises a preview image acquired by the first camera;
saving, by the electronic device in response to the first operation, a first image acquired by the first camera and a second image acquired by the second camera, wherein a viewfinder coverage in which the first camera acquires the first image is a first viewfinder coverage, a viewfinder coverage in which the second camera acquires the second image is a second viewfinder coverage, and the first viewfinder coverage is larger than the second viewfinder coverage;
receiving, by the electronic device, a second operation, wherein the second operation is used for triggering the electronic device to display the first image;
displaying, by the electronic device, the first image in response to the second operation;
receiving, by the electronic device, a third operation, wherein the third operation is used for triggering the electronic device to display a first region image in a magnified first image, the first region image comprises a first target region image, a viewfinder coverage of the first target region image relative to the first camera is a third viewfinder coverage, the first viewfinder coverage comprises the third viewfinder coverage, and the third viewfinder coverage coincides with the second viewfinder coverage; and
splicing, by the electronic device, the second image to the first target region image for displaying in response to the third operation,
wherein the electronic device further comprises a third camera, the field of view of the second camera is larger than a field of view of the third camera, and the method further comprises:
saving, by the electronic device in response to the image capture operation, a third image acquired by the third camera, wherein a viewfinder coverage in which the third camera acquires the third image is a fourth viewfinder coverage, and the second viewfinder coverage is larger than the fourth viewfinder coverage; and
the method further comprises:
receiving, by the electronic device, a fourth operation, wherein the fourth operation is used for triggering the electronic device to display a second region image in a magnified second image, the second region image comprises a third target region image, a viewfinder coverage of the third target region image relative to the second camera is a fifth viewfinder coverage, the second viewfinder coverage comprises the fifth viewfinder coverage, and the fifth viewfinder coverage coincides with the fourth viewfinder coverage;
obtaining, by the electronic device, a second factor, wherein the second factor is a magnification factor after the fourth operation triggers the electronic device to magnify the second image; and
splicing, by the electronic device, the third image to the third target region image for displaying in a case that the second factor is greater than a second preset magnification factor.

9. An electronic device for an image display, comprising:
a processor configured to:

receive a first operation performed by a user on a first interface, wherein the first interface is a viewfinder interface for image capture by the electronic device, and the first interface comprises a preview image acquired by a first camera of the electronic device;

save, in response to the first operation, a first image acquired by the first camera and a second image acquired by a second camera of the electronic device, wherein a viewfinder coverage in which the first camera acquires the first image is a first viewfinder coverage, a viewfinder coverage in which the second camera acquires the second image is a second viewfinder coverage, and the first viewfinder coverage is larger than the second viewfinder coverage;

receive a second operation, wherein the second operation is used for triggering the electronic device to display the first image;

display the first image in response to the second operation;

receive a third operation, wherein the third operation is used for triggering the electronic device to display a first region image in a magnified first image, the first region image comprises a first target region image, a viewfinder coverage of the first target region image relative to the first camera is a third viewfinder coverage, the first viewfinder coverage comprises the third viewfinder coverage, and the third viewfinder coverage coincides with the second viewfinder coverage; and splice the second image to the first target region image for displaying in response to the third operation, wherein the electronic device further comprises a third camera, a field of view of the second camera is larger than a field of view of the third camera, and wherein the processor is further configured to:

save, in response to the image capture operation, a third image acquired by the third camera, wherein a viewfinder coverage in which the third camera acquires the third image is a fourth viewfinder coverage, and the second viewfinder coverage is larger than the fourth viewfinder coverage, and wherein the processor is further configured to:

receive a fourth operation, wherein the fourth operation is used for triggering the electronic device to display a second region image in a magnified second image, the second region image comprises a third target region image, a viewfinder coverage of the third target region image relative to the second camera is a fifth viewfinder coverage, the second viewfinder coverage comprises the fifth viewfinder coverage, and the fifth viewfinder coverage coincides with the fourth viewfinder coverage;

obtain a resolution of the second region image and the resolution of the display;

calculate a second ratio according to the resolution of the second region image and the resolution of the display, wherein the second ratio is a ratio of the resolution of the second region image to the resolution of the display; and splice the third image to the third target region image for displaying in a case that the second ratio is greater than a first preset ratio.

10. The electronic device of claim 9, wherein the processor is further configured to:
splice the second image to a second target region image in the first image for displaying in response to the second operation, wherein a viewfinder coverage of the second target region image relative to the first camera coincides with the second viewfinder coverage.

11. The electronic device of claim 9, wherein the processor is further configured to:
obtain a resolution of the first region image and a resolution of the display; and
calculate a first ratio according to the resolution of the first region image and the resolution of the display, wherein the first ratio is a ratio of the resolution of the first region image to the resolution of the display; and
the splicing the second image to the first target region image for displaying comprises:
splicing the second image to the first target region image for displaying in a case that the first ratio is greater than a first preset ratio.

12. The electronic device of claim 9, wherein the processor is further configured to:
obtain a first factor, wherein the first factor is a magnification factor after the third operation triggers the electronic device to magnify the first image; and
said splice the second image to the first target region image for displaying comprises:
splice the second image to the first target region image for displaying in a case that the first factor is greater than a first preset magnification factor.

13. The electronic device of claim 12, wherein the processor is further configured to:
obtain a magnification factor of the first image, a resolution of the first image, and a resolution of the first region image; and
calculate the first factor according to the magnification factor of the first image, the resolution of the first image, and the resolution of the first region image.

14. The electronic device of claim 13, wherein the first factor satisfies the following formula:

$$M = \sqrt{\frac{B}{A}} \times Z$$

wherein M represents the first factor, B represents the resolution of the first image, A represents the resolution of the first region image, and Z represents the magnification factor of the first image.

15. The electronic device of claim 9, wherein the processor is further configured to:
blur a region in the first region image except for the first target region image in response to the third operation.

16. The electronic device of claim 9, wherein the processor is further configured to:
obtain a second factor, wherein the second factor is a magnification factor after the fourth operation triggers the electronic device to magnify the second image; and
splice the third image to the third target region image for displaying in a case that the second factor is greater than a second preset magnification factor.

* * * * *

UNITED STATES PATENT AND TRADEMARK OFFICE
CERTIFICATE OF CORRECTION

| | | |
|---|---|---|
| PATENT NO. | : 12,126,893 B2 | Page 1 of 1 |
| APPLICATION NO. | : 17/919579 | |
| DATED | : October 22, 2024 | |
| INVENTOR(S) | : Bin Xiao | |

It is certified that error appears in the above-identified patent and that said Letters Patent is hereby corrected as shown below:

On the Title Page

Change "(71) Applicant: HONOR DEVICE CO., LTD., Guangdong (CN)" to "(71) Applicant: HONOR DEVICE CO., LTD., Shenzhen (CN)".

Signed and Sealed this
Nineteenth Day of November, 2024

Katherine Kelly Vidal
*Director of the United States Patent and Trademark Office*